(12) United States Patent
Ito et al.

(10) Patent No.: US 9,660,272 B2
(45) Date of Patent: May 23, 2017

(54) OXYGEN REDUCTION CATALYST AND USE THEREOF

(71) Applicant: SHOWA DENKO K.K., Tokyo (JP)

(72) Inventors: Yuji Ito, Tokyo (JP); Junya Sakaguchi, Tokyo (JP); Takuya Imai, Tokyo (JP); Ryuji Monden, Tokyo (JP); Masayuki Yoshimura, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/903,311

(22) PCT Filed: Jul. 8, 2014

(86) PCT No.: PCT/JP2014/068119
§ 371 (c)(1),
(2) Date: Jan. 7, 2016

(87) PCT Pub. No.: WO2015/005309
PCT Pub. Date: Jan. 15, 2015

(65) Prior Publication Data
US 2016/0149225 A1    May 26, 2016

(30) Foreign Application Priority Data
Jul. 12, 2013 (JP) .................................. 2013-146722

(51) Int. Cl.
*H01M 4/86* (2006.01)
*H01M 4/90* (2006.01)
(Continued)

(52) U.S. Cl.
CPC ....... *H01M 4/8652* (2013.01); *H01M 4/8657* (2013.01); *H01M 4/9016* (2013.01);
(Continued)

(58) Field of Classification Search
CPC ............. H01M 4/8652; H01M 4/8657; H01M 4/9016; H01M 4/9041; H01M 4/92; H01M 8/10
See application file for complete search history.

(56) References Cited

U.S. PATENT DOCUMENTS

2009/0029216 A1    1/2009 Yamamoto
2010/0227253 A1    9/2010 Monden et al.
(Continued)

FOREIGN PATENT DOCUMENTS

CN      101808739 A    8/2010
CN      102413928 A    4/2012
(Continued)

OTHER PUBLICATIONS

International Search Report of PCT/JP2014/068119 dated Oct. 14, 2014 [PCT/ISA/210].
(Continued)

*Primary Examiner* — Brittany Raymond
(74) *Attorney, Agent, or Firm* — Sughrue Mion, PLLC

(57) ABSTRACT

An oxygen reduction catalyst which includes composite particles including a portion including an inorganic metal compound and a portion containing carbon. The composite particles include a metal element M1, carbon, and oxygen as constituent elements; the amount of carbon atoms is 1 to 10 mol, and the amount of oxygen atoms is 1 to 3 mol, assuming that the total amount of atoms in the metal element M1 is 1 mol; a G-band and a D-band are present in a Raman spectrum, and a V/G ratio defined in an expression described below is 0.10 to 0.35: V/G ratio=(minimum value of spectral intensity in region V which is a region between G-band and D-band)/(peak intensity in G-band).

20 Claims, 3 Drawing Sheets

(51) Int. Cl.
*H01M 4/92* (2006.01)
*H01M 8/10* (2016.01)

(52) U.S. Cl.
CPC ........... *H01M 4/9041* (2013.01); *H01M 4/92* (2013.01); *H01M 8/10* (2013.01)

(56) References Cited

U.S. PATENT DOCUMENTS

| | | |
|---|---|---|
| 2010/0331172 A1 | 12/2010 | Monden et al. |
| 2012/0094207 A1 | 4/2012 | Wakizaka et al. |
| 2012/0231338 A1 | 9/2012 | Matsuzaka et al. |
| 2012/0315568 A1 | 12/2012 | Lee et al. |
| 2013/0337367 A1 | 12/2013 | Monden et al. |
| 2014/0011102 A1 | 1/2014 | Ota et al. |
| 2014/0120454 A1 | 5/2014 | Takahashi et al. |
| 2014/0186743 A1 | 7/2014 | Wakizaka et al. |
| 2014/0193739 A1 | 7/2014 | Takahashi et al. |

FOREIGN PATENT DOCUMENTS

| | | |
|---|---|---|
| EP | 2428268 A1 | 3/2012 |
| JP | 2005-246181 A | 9/2005 |
| JP | 2006-8472 A | 1/2006 |
| JP | 2012-200643 A | 10/2012 |
| JP | 2013-127869 A | 6/2013 |
| WO | 2006/088194 A1 | 8/2006 |
| WO | 2009/104500 A1 | 8/2009 |
| WO | 2010/126020 A1 | 11/2010 |
| WO | 2011/070975 A1 | 6/2011 |
| WO | 2011/099493 A1 | 8/2011 |
| WO | 2012/035501 A1 | 3/2012 |
| WO | 2012/172823 A1 | 12/2012 |
| WO | 2013/008501 A1 | 1/2013 |
| WO | 2013/035191 A1 | 3/2013 |

OTHER PUBLICATIONS

Extended European Search Report dated Feb. 16, 2017, issued in corresponding Application No. 14823664.9.

Sergiienko R et al:"Nanographite structures formed during annealing of disordered carbon containing finely-dispersed carbon nanocapsules with iron carbide cores" Carbon, Elsevier, Oxford, GB, vol. 47, No. 4, Apr. 2009, pp. 1056-1065.

→ PORTION CONTAINING CARBON

→ PORTION COMPRISING INORGANIC METAL COMPOUND

OXYGEN REDUCTION CATALYST AND USE THEREOF

CROSS REFERENCE TO RELATED APPLICATIONS

This application is a National Stage of International Application No. PCT/JP2014/068119 filed Jul. 8, 2014, claiming priority based on Japanese Patent Application No. 2013-146722, filed Jul. 12, 2013, the contents of all of which are incorporated herein by reference in their entirety.

TECHNICAL FIELD

The present invention relates to oxygen reduction catalysts and uses thereof. More specifically, the present invention relates to an oxygen reduction catalyst that can be preferably used particularly as a catalyst for an electrode for a fuel cell and to a use thereof.

BACKGROUND ART

A polymer electrolyte fuel cell (PEFC) is a fuel cell with the form in which a solid polymer electrolyte is sandwiched between an anode and a cathode, a fuel is supplied to the anode, oxygen or air is supplied to the cathode, oxygen is reduced at the cathode to produce electricity. As the fuel, hydrogen, methanol, or the like is mainly used. To enhance the reaction rate in a fuel cell and to enhance the energy conversion efficiency of the fuel cell, a layer containing a catalyst has been conventionally disposed on the cathode and anode surfaces of the fuel cell. As the catalyst, noble metals have been generally used, and, among the noble metals, platinum, which is stable at a high potential and has a high activity, has been mainly used. As a carrier on which the catalytic metal is carried, carbon black has been conventionally used.

In the PEFC, the cathode is temporarily exposed to a high potential, for example, around 1.5 V during repeated start/stop operation. It is known that under such a high potential, carbon black which is a carrier is oxidatively corroded in the presence of water, a catalytic metal falls or aggregates, the deterioration of catalytic activity, the deterioration of the conductivity of a catalyst layer, or the like occurs, and electricity generation performance is deteriorated. Therefore, there have been demanded a carrier or a catalyst having durability to a high potential caused by starting and stopping; and a fuel cell electrode catalyst in which the carrier or the catalyst is used.

Against such a problem, it has been examined to suppress carbon corrosion of a catalyst carrier in start/stop of PEFC.

Patent Literature 1 describes an electrode catalyst obtained by heat treatment of a carbon material, on which a noble metal catalyst is carried, under inert gas atmosphere. The literature discloses that an amorphous portion on the surface of the carbon material is removed utilizing the catalytic action of a noble metal catalyst (for example, Pt or Pt alloy), the graphitization degree of a carrier surface is improved, and the durability to carbon corrosion can be further improved. The graphitization degree is defined as a ratio (I1355/I1580) of intensity (I1355) at $\Delta v1355$ (peak in the vicinity of 1355 cm$^{-1}$ in Raman spectrum) to intensity (I1580) at $\Delta v1580$ (peak in the vicinity of 1580 cm$^{-1}$ in Raman spectrum) in a Raman spectrum. It is described that the graphitization degree is more improved with decreasing the value of the ratio.

Patent Literature 2 describes a carrier for carrying a catalyst, obtained by carbonizing a raw material containing a nitrogen-containing organic substance and a metal. In addition, the carrier may be a carrier for carrying a catalyst, having an intensity ratio (I1360/I1580) of a band at 1360 cm$^{-1}$ to a band at 1580 cm$^{-1}$ in a Raman spectrum of 0.3 or more and 1.0 or less. The carrier is included in an appropriate balance indicated by the range of the intensity ratio D/G (I1360/I1580) as described above, to be able to be thereby provided with both of high durability and high catalyst-carrying performance.

Patent Literature 3 describes a catalyst comprising a metal element M, carbon, nitrogen, and oxygen, wherein peaks are observed at 1340 cm$^{-1}$ to 1365 cm$^{-1}$ and at 1580 cm$^{-1}$ to 1610 cm$^{-1}$ as measured by Raman spectroscopy, and the metal element M is one selected from the group consisting of titanium, iron, niobium, zirconium, and tantalum. It is described that the catalyst which is not corroded in an acidic electrolyte or at a high potential is stable. It is described that assuming that the height of the peak at 1340 cm$^{-1}$ to 1365 cm$^{-1}$ is D while the height of the peak at 1580 cm$^{-1}$ to 1610 cm$^{-1}$ is G (with the proviso that D and G are the heights obtained by subtraction of a baseline height), D/G is preferably 0.1 or more and 10 or less, and D/G of 0.1 or more and 10 or less is considered to allow electrons to be supplied to a site having a high activity and is desirable for an electrode catalyst.

Patent Literature 4 describes a composite material of nanostructured graphite, comprising a graphite aggregate in which primary particles of nanostructured graphite in which the sizes of crystallites are 1 to 20 nm aggregate, wherein either metal or metal oxide is allowed to be contained in, carried by, or compounded into the nanostructured graphite in which the average particle diameter of the graphite aggregate is 0.5 to 50 μm. The intensity ratio (I1360/I1580) between the Raman bands of the nanostructured graphite may be in a range of 0.4 to 1.7. Limitation into the range achieves a carbon material with improvement in conductivity and with a structure optimal for a Pt fine particle-carried material.

CITATION LIST

Patent Literature

Patent Literature 1: WO 2006/088194
Patent Literature 2: WO 2011/070975
Patent Literature 3: WO 2010/126020
Patent Literature 4: Japanese Patent Laid-Open No. 2006-8472

SUMMARY OF INVENTION

Technical Problem

However, all the catalysts described above, and the like have been susceptible to improvement in durability against repetition of starting and stopping of a fuel cell (hereinafter also referred to as "start/stop durability").

Accordingly, it is an object of the present invention to provide an oxygen reduction catalyst that exhibits favorable initial performance and is excellent in start/stop durability.

Solution to Problem

The present invention relates to, for example, the following [1] to [17].

[1]

An oxygen reduction catalyst comprising composite particles comprising a portion comprising an inorganic metal compound and a portion containing carbon, wherein the composite particles comprise a metal element M1, carbon, and oxygen as constituent elements;

the metal element M1 is at least one metal element selected from elements belonging to Groups 2 to 7 and elements belonging to Groups 11 to 15;

the amount of carbon atoms is 1 to 10 mol, and the amount of oxygen atoms is 1 to 3 mol, assuming that the total amount of atoms in the metal element M1 is 1 mol;

a G-band and a D-band are present in a Raman spectrum, and a V/G ratio defined in an expression described below is 0.10 to 0.35.

V/G ratio=(minimum value of spectral intensity in region V which is a region between G-band and D-band)/(peak intensity in G-band)

[2]

An oxygen reduction catalyst comprising composite particles comprising a portion comprising an inorganic metal compound and a portion containing carbon, wherein the composite particles comprise a metal element M1, carbon, and oxygen as constituent elements;

the metal element M1 is at least one metal element selected from elements belonging to Group 4 and elements belonging to Group 5;

the amount of carbon atoms is 1 to 10 mol, and the amount of oxygen atoms is 1 to 3 mol, assuming that the total amount of atoms in the metal element M1 is 1 mol;

a G-band and a D-band are present in a Raman spectrum, and a V/G ratio defined in an expression described below is 0.10 to 0.35.

V/G ratio=(minimum value of spectral intensity in region V which is a region between G-band and D-band)/(peak intensity in G-band)

[3]

The oxygen reduction catalyst according to the above [1] or [2], wherein the metal element M1 is at least one selected from the group consisting of vanadium, zirconium, niobium, hafnium, and tantalum.

[4]

The oxygen reduction catalyst according to any one of the above [1] to [3], wherein the amount of carbon is 1 mol or more and 7 mol or less, the amount of nitrogen is more than 0 mol and 1 mol or less, and the amount of oxygen is 1 mol or more and 3 mol or less, assuming that the amount of the metal element M1 is 1 mol.

[5]

The oxygen reduction catalyst according to any one of the above [1] to [4], wherein the composite particles further comprise, as the metal element, at least one metal element M2 selected from the group consisting of iron, cobalt, and nickel; and the amount of the metal element M2 is 0.3 mol or less assuming that the total amount of the metal element M1 is 1 mol.

[6]

The oxygen reduction catalyst according to any one of the above [1] to [5], wherein the portion comprising the inorganic metal compound is a crystal containing the metal element M1.

[7]

The oxygen reduction catalyst according to the above [6], wherein the crystallite size of the crystal is 5 to 100 nm.

[8]

The oxygen reduction catalyst according to any one of the above [1] to [7], wherein a BET specific surface area is 50 to 1000 m$^2$/g.

[9]

The oxygen reduction catalyst according to any one of the above [1] to [8], further comprising particles comprising a noble metal or a noble metal alloy carried on the composite particles.

[10]

The oxygen reduction catalyst according to the above [9], wherein the noble metal is at least one noble metal selected from platinum, palladium, iridium, rhodium, and ruthenium.

[11]

The oxygen reduction catalyst according to the above [9] or [10], wherein the noble metal alloy is an alloy of noble metals or an alloy comprising a noble metal and at least one metal selected from iron, nickel, chromium cobalt, titanium, copper, vanadium, and manganese.

[12]

The oxygen reduction catalyst according to any one of the above [1] to [11], used as a catalyst for a reaction of converting oxygen into water.

[13]

An ink for producing a fuel cell catalyst layer, comprising the oxygen reduction catalyst according to any one of the above [1] to [12] dispersed in a solvent.

[14]

A fuel cell catalyst layer comprising the oxygen reduction catalyst according to any one of the above [1] to [13].

[15]

A fuel cell electrode comprising the fuel cell catalyst layer according to the above [14].

[16]

A membrane electrode assembly comprising a cathode catalyst layer, an anode catalyst layer, and a polymer electrolyte membrane interposed between both of the catalyst layers, wherein the cathode catalyst layer and/or the anode catalyst layer are the fuel cell catalyst layers according to the above [14].

[17]

A fuel cell comprising the membrane electrode assembly according to the above [16].

Advantageous Effects of Invention

The oxygen reduction catalyst of the present invention is excellent in start/stop durability when used as an oxygen reduction catalyst for an electrode for a fuel cell.

DESCRIPTION OF EMBODIMENTS

Figure 1:
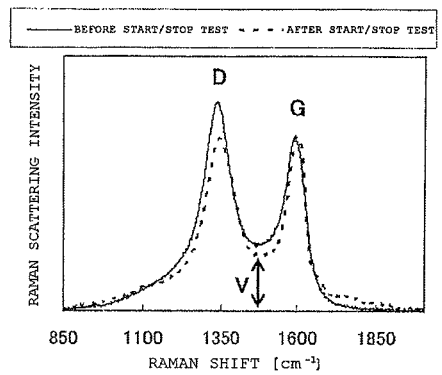
FIG. 1 is the Raman spectrum of an oxygen reduction catalyst in which platinum is carried on a carbon carrier in "Case 1: Case in Which Carbon Carrier is Used".

The oxygen reduction catalyst according to the present invention and the like will be explained in more detail below.

[Oxygen Reduction Catalyst]

The oxygen reduction catalyst according to the present invention is an oxygen reduction catalyst comprising composite particles comprising a portion comprising an inorganic metal compound and a portion containing carbon, wherein the composite particles comprise, as constituent elements, a metal element M1, carbon, and oxygen; the amount of carbon atoms is 1 mol or more and 10 mol or less, and the amount of oxygen atoms is 1 mol or more and 3 mol or less, assuming that the total amount of the atoms of the metal element M1 is 1 mol; and a certain feature is observed in a Raman spectrum.

<Composite Particles>

In accordance with the present invention, the composite particles mean particles comprising a portion comprising an inorganic metal compound and a portion containing carbon. The composite particles contain a metal element M1, carbon, and oxygen as specific constituent elements, and preferably further contain nitrogen from the viewpoint of expressing the high activity of the oxygen reduction catalyst.

The metal element M1 is at least one metal element selected from elements belonging to Groups 2 to 7 and elements belonging to Groups 11 to 15 (with the proviso that in the present invention, silicon is regarded as a metal), and is preferably at least one metal element M1 selected from elements belonging to Group 4 and elements belonging to group 5 from the viewpoint of obtaining the oxygen reduction catalyst having high catalytic activity. Specific examples of the metal element M1 include titanium, vanadium, zirconium, niobium, hafnium, and tantalum, and these may be used singly or in combination of two or more kinds thereof. The combination of two or more kinds thereof may be a combination of, for example, titanium and another metal element (such as vanadium, zirconium, niobium, hafnium, or tantalum). Among them, the combination of titanium and zirconium or the combination of titanium and niobium is preferred as the combination of titanium and the other metal element.

The composite particles preferably contain at least one metal element M2 selected from iron, cobalt, and nickel, as well as the metal element M1. As the metal element M2, there can be preferably used a metal element contained in a catalyst used for vapor phase growth of carbon. Since iron group elements generally have the catalytic action, iron, cobalt, and nickel which are iron group elements are still more preferred, and iron is particularly preferred, as the metal element M2. Several kinds of them may also be used.

The molar ratio of the atoms of the metal element M2 to the atoms of the metal element M1 (metal element M2/metal element M1) is preferably 0.3 or less, more preferably 0.05 to 0.2, from the viewpoint of preventing the metal element M2 from being eluted to deteriorate catalytic activity when a fuel cell in which the oxygen reduction catalyst of the present invention is used in an electrode is operated.

The "portion comprising inorganic metal compound" contains the metal element M1, preferably contains oxygen, and may further contain nitrogen and carbon.

Examples of the inorganic metal compound included in the portion comprising the inorganic metal compound include silicon oxide (with the proviso that in the present invention, silicon is regarded as a metal), titanium oxide, manganese oxide, zirconium oxide, niobium oxide, and tin oxide.

The portion comprising the inorganic metal compound, which may be amorphous, is preferably a crystal containing one or more elements selected from the elements belonging to Group 4 and the elements belonging to Group 5. Whether the portion comprising the inorganic metal compound is amorphous or crystalline can be confirmed by X-ray diffraction analysis of the composite particles.

The crystallite size of the crystal is preferably 5 nm or more, more preferably 10 nm or more, still more preferably 15 nm or more, from the viewpoint of enhancing start/stop durability, and is preferably 100 nm or less, more preferably 80 nm or less, still more preferably 70 nm or less, from the viewpoint of obtaining the oxygen reduction catalyst having high catalytic activity. The value of the crystallite size is a value measured by a method adopted in examples mentioned later.

The "portion containing carbon" mainly contains carbon and may further contain the metal element M1, nitrogen, and oxygen. In this case, carbon may be present in either crystalline or amorphous state. In the Raman spectrum of the composite particles used in the present invention, a G-band and a D-band are present, and a V/G ratio, which is the ratio of the minimum value of the spectral intensity of a region V between the G-band and the D-band to the peak intensity of the G-band, is 0.10 to 0.35. The spectrum does not necessarily derive from the structure of only the "portion containing carbon" but is considered to reflect any structure of the "portion containing carbon". Based on the spectrum, it can be presumed that a site having a graphite structure appearing as the G-band, a site, in which a graphite structure is disordered, appearing as the D-band, and a site having a structure with low start/stop durability, appearing as the region V, as mentioned later, are mixed in the "portion containing carbon". It can be presumed that the site appearing as the region V is a site probably having a low crystallinity (high amorphous property) because of being considered to have low start/stop durability.

The "portion comprising inorganic metal compound" and the "portion containing carbon" do not overlap one another but are present independently of each other.

In the composite particles, such a feature as mentioned later is observed in the Raman spectrum.

By observing the composite particles with a transmission electron microscope (TEM) to perform elemental analysis by energy dispersive X-ray spectroscopy (EDX), it can be confirmed that the composite particles comprise the portion comprising the inorganic metal compound and the portion containing carbon. The shape of each portion can be confirmed from a TEM image, the constituent elements of each portion can be confirmed by the EDX analysis, and the distribution of the constituent elements can be confirmed by mapping the constituent elements. In addition, the TEM image can confirm that the portion comprising the inorganic metal compound is particulate.

As for the rate of each element included in the composite particles, the rate of carbon atoms is 1 to 10 mol, preferably 1 to 8 mol, more preferably more than 2 mol and 8 mol or less, most preferably 3 to 7 mol, the molar ratio of nitrogen atoms is preferably 1 mol or less, more preferably 0.01 to 0.4 mol, still more preferably 0.02 to 0.35 mol, and the molar ratio of oxygen is preferably 1 to 3 mol, more preferably 1.2 to 3 mol, still more preferably 1.4 to 2.5 mol, assuming that the total amount of the metal element M1 is 1 mol. The oxygen reduction catalyst according to the present invention has favorable initial performance and excellent start/stop durability when the rate of each element is within the range.

The specific surface area of the composite particles, calculated by a BET method, is preferably 50 $m^2/g$ or more, more preferably 100 $m^2/g$ or more, still more preferably 150 $m^2/g$ or more, from the viewpoint of enhancing the activity of the oxygen reduction catalyst, and is preferably 1000 $m^2/g$ or less, more preferably 900 $m^2/g$ or less, from the viewpoint of enhancing start/stop durability.

<Raman Spectrum>

In the Raman spectrum of the oxygen reduction catalyst of the present invention, a certain feature is observed (i.e., "V/G ratio" mentioned later is 0.10 to 0.35).

In the present invention, a G-band is a peak having the maximum value in a Raman shift region of $1580\pm50$ $cm^{-1}$ in a Raman spectrum while a D-band is a peak having the maximum value in a Raman shift region of $1350\pm50$ $cm^{-1}$.

In general, in a carbon material, a D/G ratio which is the ratio of the peak intensity of a D-band (i.e., peak height from baseline; also referred to as "height of D-band" in the present invention) to the peak intensity of a G-band (i.e., peak height from baseline; also referred to as "height of G-band" in the present invention) is referred to as an R-value, which is regarded as the index of a graphitization degree. The G-band is caused by the structure of graphite in itself while the D-band is caused by the disorder or defect of a structure. Accordingly, the lower the R-value is, the higher the graphitization degree in the vicinity of the surface of the carbon material is.

The lower the R-value is, the higher the start/stop durability is, when an oxygen reduction catalyst containing a carbon carrier is used as an electrode catalyst for a fuel cell, whereas the present inventors found that it is expected that such an expected behavior is not necessarily exhibited in an oxygen reduction catalyst comprising composite particles comprising a portion comprising an inorganic metal compound and a portion containing carbon as used in the present invention.

In addition, the present inventors found that the start/stop durability of an oxygen reduction catalyst comprising such composite particles is greatly influenced by a V/G ratio which is the ratio of the minimum value of the spectral intensity of a region V (on a baseline basis) (hereinafter also referred to as "height of V") to the peak intensity of a G-band assuming that a region between the G-band and a D-band in a Raman spectrum (also referred to as "trough between G-band and D-band" in the present invention) is "region V". The V/G ratio is represented by the following expression.

V/G ratio=(minimum value of spectral intensity in "region V" as region between G-band and D-band)/(peak intensity of G-band)

In a case in which before and after a test of a simulation of repeatedly starting and stopping a fuel cell in which an oxygen reduction catalyst comprising such composite particles as mentioned above is used as an electrode catalyst (hereinafter also referred to as "start/stop test"), the Raman spectra of the oxygen reduction catalyst are compared, the height of a G-band and the height of a D-band hardly vary whereas the height of V greatly varies (decreases). This suggests that in such composite particles mentioned above, a structure deriving from a D-band is durable against the start/stop test while a structure deriving from a region V is degraded by the start/stop test.

Based on this fact, the present inventors found that the start/stop durability of an oxygen reduction catalyst comprising such composite particles mentioned above can be improved by decreasing the height of V, i.e., by reducing the value of a V/G ratio.

The above-described content will be further explained below with reference to a specific example.

In the specific examples described below, a target for measurement of a Raman spectrum is an oxygen reduction catalyst comprising composite particles on which noble metal particles mentioned later are carried; however, since the noble metal is particulate and is only carried on the surfaces of the composite particles, the carried noble metal particles do not substantially influence the intensities of a G-band, a D-band, and V in the Raman spectrum of the composite particles in themselves.

(Case 1: Case in which Carbon Carrier is Used)

FIG. 1 illustrates the Raman spectra of an oxygen reduction catalyst before and after a start/stop test on a fuel cell in which the oxygen reduction catalyst (catalyst used in Comparative Example 11 mentioned later) in which platinum at a concentration of 50 mass % is carried on a carbon carrier (assuming that the total of platinum and the carbon carrier is 100 mass %) is used as a cathode catalyst. A sample used for measurement is a cathode catalyst portion in a membrane electrode assembly mentioned later. Similar samples are also used in Cases 2 and 3 described below. The membrane electrode assembly was produced according to a method described in examples mentioned later.

D/G ratios and V/G ratios before and after the start/stop test are as described below. In addition, the voltage retention rate (ratio of voltage value of fuel cell after start/stop test to voltage value of fuel cell before start/stop test) of the oxygen reduction catalyst is 68%, exhibiting low start/stop durability.

TABLE 1

|  | Before test | After test |
|---|---|---|
| D/G ratio | 1.2 | 1.0 |
| V/G ratio | 0.36 | 0.28 |

Reductions in the height of the D-band and in the height of V are considered to be caused by a reduction in portion susceptible to oxidation corrosion due to the start/stop test, in the carbon carrier. Based on this, it is found that a carrier in which a portion susceptible to oxidation corrosion is small in a carbon carrier, i.e., in which the height of a D-band and the height of V are low in a Raman spectrum is preferred as a carrier for improving start/stop durability. However, as described below, this does not apply to an oxygen reduction catalyst comprising composite particles comprising a portion comprising an inorganic metal compound and a portion containing carbon as mentioned above.

(Case 2: Case in which Composite Particles are Used, and Start/Stop Durability is Low)

Figure 2:
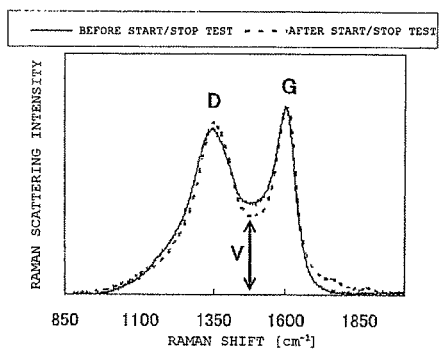
FIG. 2 is the Raman spectrum of an oxygen reduction catalyst in "Case 2: Case in Which Composite Particles Are Used, And Start/Stop Durability Is Low".

Next, FIG. 2 illustrates the Raman spectra of an oxygen reduction catalyst before and after a start/stop test in the case of changing the carbon carrier to composite particles (particles produced by a method described in Example 3-11 in International Publication No. WO 2011/099493) and of using the oxygen reduction catalyst on which platinum is carried in a manner similar to that in [Example 1-2]<Production of Oxygen Reduction Catalyst Comprising Noble Metal-Carried Composite Particles> mentioned later.

D/G ratios and V/G ratios before and after the start/stop test are as described below. In addition, the voltage retention rate of the oxygen reduction catalyst is 24%, exhibiting low start/stop durability.

TABLE 2

|  | Before test | After test |
|---|---|---|
| D/G ratio | 0.90 | 0.90 |
| V/G ratio | 0.50 | 0.41 |

In the Raman spectra in FIG. 2, the height of the D-band hardly varies before and after the start/stop test. In addition, start/stop durability is low although the D/G ratio before the test is 0.9, which is low compared to that of the carbon carrier mentioned above. Based on this, unlike the case of using the carbon carrier, the height of the D-band is found not to be related to the level of the start/stop durability very much in the case of using the composite particles.

(Case 3: Case in which Composite Particles are Used, and Start/Stop Durability is High)

Figure 3:
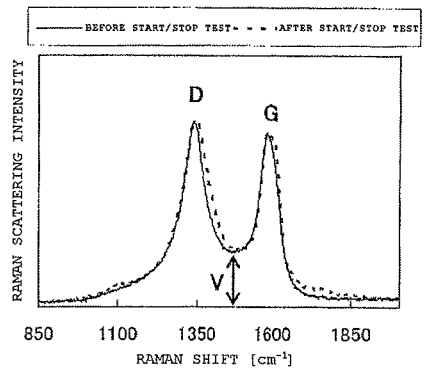
FIG. 3 is the Raman spectrum of an oxygen reduction catalyst in "Case 3: Case in Which Composite Particles Are Used, And Start/Stop Durability Is High".

Further, FIG. 3 illustrates the Raman spectra of an oxygen reduction catalyst before and after a start/stop test in the case of changing the oxygen reduction catalyst to the other oxygen reduction catalyst (platinum-carried particles (5) used in Example 5-2 mentioned later).

D/G ratios and V/G ratios before and after the start/stop test are as described below. In addition, the voltage retention rate of the oxygen reduction catalyst is 90%, exhibiting high start/stop durability.

TABLE 3

|  | Before test | After test |
|---|---|---|
| D/G ratio | 1.1 | 1.1 |
| V/G ratio | 0.28 | 0.28 |

In the Raman spectra in FIG. 3, the height of the D-band hardly varies before and after the start/stop test. In addition, start/stop durability is high although the D/G ratio before the test is 1.1, which is high compared to that of the case 2 of using the composite particles. Based on this, unlike the case of using the carbon carrier, the height of the D-band is also found not to be related to the level of the start/stop durability very much in the case of using the composite particles.

In the case of using the composite particles, the height of V is lower than that of the composite particles mentioned above, and the V/G ratio is as low as 0.28. In addition, it is found that the V/G ratio hardly varies before and after the start/stop.

The V/G ratio of the oxygen reduction catalyst of the present invention is 0.10 or more and 0.35 or less and such oxygen reduction catalysts have high catalytic activity and start/stop durability. The V/G ratio is preferably 0.30 or less to give high start/stop durability. The V/G ratio is preferably 0.15 or more, still more preferably 0.20 or more to give high catalytic activity.

<Particles Comprising Noble Metal or Alloy of Noble Metals>

The oxygen reduction catalyst of the present invention comprises the composite particles and preferably further comprises particles comprising a noble metal or an alloy of noble metals (hereinafter also referred to as "noble metal particles"), carried on the composite particles. The oxygen reduction catalyst of the present invention expresses a high initial activity when comprising such particles.

As the noble metal, there can be used at least one selected from platinum, gold, palladium, iridium, rhodium, and ruthenium. Of these, at least one selected from platinum, palladium, and iridium is preferred, and platinum is more preferred. Examples of the alloy of noble metals include alloys of the noble metals, and alloys of the noble metals and at least one metal selected from, for example, iron, nickel, chromium, cobalt, titanium, copper, vanadium, and manganese. Of these, combinations of platinum-palladium and platinum-ruthenium are preferable as the alloys of the noble metals, and alloys of at least one metal selected from iron, cobalt, and nickel, and platinum are preferable as the alloys of the noble metals and the non-noble metals.

The carried amount of the noble metal particles (assuming that the mass of the oxygen reduction catalyst is 100 mass %) is preferably 5 mass % or more, more preferably 10 mass % or more, from the viewpoint of eliminating the need for thickening a catalyst layer and of obtaining high catalytic activity when the catalyst layer is formed using the oxygen reduction catalyst of the present invention, and is preferably 60 mass % or less, more preferably 50 mass % or less, from the viewpoint of being capable of stably forming a catalyst layer using the oxygen reduction catalyst of the present invention.

[Method for Producing Oxygen Reduction Catalyst]

When the oxygen reduction catalyst of the present invention consists of the composite particles, the oxygen reduction catalyst can be produced by, for example, the following production method:

the method for producing an oxygen reduction catalyst, comprising:

a step 1 of mixing a compound containing the metal element M1 (hereinafter also referred to as "M1-containing compound (1)") M1-containing compound (1), an organic compound comprising a functional group that can coordinate to the metal element M1, and a solvent to obtain a catalyst precursor solution;

a step 2 of removing the solvent from the catalyst precursor solution to obtain a solid residue;

a step 3 of performing heat treatment of the solid residue;

and a step 4 of performing oxidation treatment of the solid residue, wherein at least one of the M1-containing compound (1) and the organic compound comprises oxygen atoms.

The oxygen reduction catalyst comprising the composite particles of the present invention can be easily produced by the method comprising a step of coordinating the organic compound having a functional group that can coordinate to the metal element M1 to the metal element M1 of the M1-containing compound (1).

Examples of the functional group that can coordinate to the metal element M1 include carboxyl group, hydroxyl group, ketone structure, or the like. Examples of the organic compound comprising the functional group include lactic acid, acrylic acid, methacrylic acid, oxalic acid, malic acid, citric acid, fumaric acid, salicylic acid, and acetylacetone.

As the organic compound having the functional group that can coordinate to the metal element M1, a nitrogen-containing organic compound (2) is preferable from the viewpoint of improving catalytic activity.

The method for producing the oxygen reduction catalyst comprises performing oxidation treatment of a solid residue obtained by burning a precursor comprising a metal-containing organic complex and an organic compound or performing oxidation treatment of the precursor while being burnt, to reduce the amount of a site having a structure with low start/stop durability, appearing as a region V, and to decrease a V/G ratio.

Specific examples of the method for producing the oxygen reduction catalyst described above include three embodiments described below.

[First Embodiment]

A first embodiment comprises:

a step 1 of mixing an M1-containing compound (1), a nitrogen-containing organic compound (2), and a solvent to obtain a catalyst precursor solution;

a step 2 of removing the solvent from the catalyst precursor solution to obtain a solid residue;

a step 3a of heat-treating the solid residue, obtained in the step 2, at a temperature of 700° C. to 1400° C. to obtain a heat-treated product; and a step 4a of performing oxidation treatment of the heat-treated product, obtained in the step 3a, with oxidizing agent that donates oxygen atoms. At least one of the M1-containing compound (1) and the nitrogen-containing organic compound (2) comprises oxygen atoms, and a V/G ratio is adjusted in a range of 0.10 to 0.35 by the oxidation treatment of the step 4a.

The first embodiment is described below.

(Step 1)

In the step 1, at least the M1-containing compound (1), the nitrogen-containing organic compound (2), and the solvent are mixed to obtain the catalyst precursor solution. When composite particles containing the metal element M2 are prepared, a compound containing the metal element M2 (hereinafter also referred to as "M2-containing compound (3)") may be further added to the catalyst precursor solution. The order of addition of these materials is not particularly limited.

The mixing is preferably performed while stirring the solvent in order to allow a reaction to smoothly occur. In this case, when it is difficult to dissolve the above-described compounds in the solvent, warming may be performed. When heat is rapidly generated during the mixing, the mixing is performed while cooling, or small amounts thereof are mixed.

M1-Containing Compound (1);

The M1-containing compound (1) is a compound containing at least one metal element selected from the elements belonging to Groups 2 to 7 and the elements belonging to Groups 11 to 15. The M1-containing compound (1) preferably contains at least one selected from oxygen atoms and halogen atoms, and specific examples thereof include metal complexes as well as phosphates, sulfates, nitrates, organic acid salts, acid halides (intermediate hydrolysates of halides), alkoxides, halides, perhalates, and hypohalites of metals. More preferably, examples thereof include at least one selected from metal complexes and metal complex salts as well as alkoxides, acetylacetonate complexes, chlorides, bromides, iodides, acid chlorides, acid bromides, acid iodides, and sulfates of metals. Still more preferably, examples thereof include metal complexes and metal complex salts as well as chlorides, alkoxides, and acetylacetonate complexes of metals from the viewpoint of solubility in the solvent in the liquid phase. Particularly preferably, examples thereof include alkoxides or acetylacetonate complexes of metals. These may be used singly or in combination of two or more kinds. Use of the metal compounds facilitates handling as a solution and coordination of the nitrogen-containing organic compound (2) to a metal element.

Examples of the metal element M1 contained in the M1-containing compound (1) preferably include at least one metal element selected from the elements belonging to Group 4 and the elements belonging to Group 5, as described in the explanation of the composite particles described above. Specific examples of the metal element M1 include titanium, vanadium, zirconium, niobium, hafnium, and tantalum, and these may be used singly or in combination of two or more kinds. For example, the metal element M1 may be at least one selected from the group consisting of vanadium, zirconium, niobium, hafnium, and tantalum, or may be a combination of titanium and another metal element (for example, vanadium, zirconium, niobium, hafnium, and tantalum) (preferably, a combination of titanium and zirconium or a combination of titanium and niobium).

Specific examples of the M1 content compound (1) include:

titanium compounds such as titanium tetramethoxide, titanium tetraethoxide, titanium tetrapropoxide, titanium tetraisopropoxide, titanium tetrabutoxide, titanium tetraisobutoxide, titanium tetrapentoxide, titanium tetraacetylacetonate, titanium diisopropoxide diacetylacetonate (Ti(acac)$_2$(O-iPr)$_2$, wherein acac represents an acetylacetonato ion and iPr represents an isopropyl group; hereinafter the same applies), titanium oxydiacetylacetonate, bis[tris(2,4-pentanedionato)titanium(IV)] hexachlorotitanate(IV) ([Ti(acac)$_3$]$_2$[TiCl$_6$]), titanium tetrachloride, titanium trichloride, titanium oxychloride, titanium tetrabromide, titanium tribromide, titanium oxybromide, titanium tetraiodide, titanium triiodide, and titanium oxyiodide;

niobium compounds such as niobium pentamethoxide, niobium pentaethoxide, niobium pentaisopropoxide, niobium pentabutoxide, niobium pentapentoxide, niobium triacetylacetonate, niobium pentaacetylacetonate, niobium diisopropoxide triacetylacetonate (Nb(acac)$_3$(O-iPr)$_2$), tris(2,2,6,6-tetramethyl-3,5-heptanedionato)niobium, niobium (III) hexafluoroacetylacetonate, niobium pentachloride, niobium oxychloride, niobium pentabromide, niobium oxybromide, niobium pentaiodide, and niobium oxyiodide;

zirconium compounds such as zirconium tetramethoxide, zirconium tetraethoxide, zirconium tetrapropoxide, zirconium tetraisopropoxide, zirconium tetrabutoxide, zirconium tetraisobutoxide, zirconium tetrapentoxide, zirconium tetraacetylacetonate, zirconium diisopropoxide diacetylacetonate (Zr(acac)$_2$(O-iPr)$_2$), tetrakis(diethylamino)zirconium, tetrakis(2,2,6,6-tetramethyl-3,5-heptanedionato)zirconium, zirconium(IV) hexafluoroacetylacetonate, tetra-1-methoxy-2-methyl-2-propoxyzirconium (IV), zirconium tetrachloride, zirconium oxychloride, zirconium tetrabromide, zirconium oxybromide, zirconium tetraiodide, and zirconium oxyiodide;

tantalum compounds such as tantalum pentamethoxide, tantalum pentaethoxide, tantalum pentaisopropoxide, tantalum pentabutoxide, tantalum pentapentoxide, tantalum tetraethoxyacetylacetonate, tantalum diisopropoxide diacetylacetonate (Ta(acac)$_2$(O-iPr)$_2$), pentakis(diethylamino)tantalum, tantalum pentachloride, tantalum oxychloride, tantalum pentabromide, tantalum oxybromide, tantalum pentaiodide, and tantalum oxyiodide;

hafnium compounds such as hafnium tetramethoxide, hafnium tetraethoxide, hafnium tetrapropoxide, hafnium tetraisopropoxide, hafnium tetrabutoxide, hafnium tetraisobutoxide, hafnium tetrapentoxide, hafnium tetraacetylacetonate, tetrakis(diethylamino)hafnium, tetra-1-methoxy-2-methyl-2-propoxyhafnium (IV), hafnium(IV) acetylacetonate, tetrakis(2,2,6,6-tetramethyl-3,5-heptanedionato)hafnium, hafnium(IV) hexafluoroacetylacetone, hafnium tetrachloride, hafnium oxychloride, hafnium bromide, hafnium oxybromide, hafnium iodide, and hafnium oxyiodide; and vanadium compounds such as vanadium(V) trimethoxideoxide, vanadium(V) ethoxide, vanadium(V) triethoxideoxide, vanadium(V) tri-i-propoxideoxide, vanadium(V) tri-n-butoxideoxide, vanadium(V) tri-t-butoxideoxide, vanadium(V) isopropoxide acetylacetonates (V(acac)(O-iPr)$_4$, V(acac)$_2$(O-iPr)$_3$, V(acac)$_3$(O-iPr)$_2$, V(acac)$_4$(O-iPr)), vanadium(III) acetylacetonate, vanadium(III) acetylacetone, tris(2,2,6,6-tetramethyl-3,5-heptanedionato) vanadium(III), vanadium(III) hexafluoroacetylacetone, vanadium(II) chloride, vanadium(III) chloride, vanadium(IV) chloride, vanadium(V) oxytrichloride, vanadium(III) bromide, vanadium (V) oxybromide, vanadium(III) iodide, and vanadium(V) oxyiodide. These may be used singly or in combination of two or more kinds.

When the composite particles contain the metal element M2, the V/G ratio of the oxygen reduction catalyst of the present invention is easily adjusted in a desired range. As the metal element M2, metal elements contained in catalysts used for vapor phase growth of carbon is preferred, iron, cobalt, and nickel which are iron group elements are still more preferred, and iron is particularly preferred. These may be used in several kinds.

Specific examples of the M2-containing compound (3) include:

iron compounds such as iron(II) chloride, iron(III) chloride, iron(III) sulfate, iron(II) sulfide, iron(III) sulfide, potassium ferrocyanide, potassium ferricyanide, ammonium ferrocyanide, ammonium ferricyanide, iron ferrocyanide, iron (II) nitrate, iron(III) nitrate, iron(II) oxalate, iron(III) oxalate, iron(II) phosphate, iron(III) phosphate ferrocene, iron(II) hydroxide, iron(III) hydroxide, iron(II) oxide, iron (III) oxide, triiron tetraoxide, iron(II) ammonium ethylenediamine tetraacetate, iron(II) acetate, iron(II) lactate, and iron(III) citrate;

cobalt compounds such as cobalt(II) chloride, cobalt(III) chloride, cobalt(II) sulfate, cobalt(II) sulfide, cobalt(II) nitrate, cobalt(III) nitrate, cobalt(II) oxalate, cobalt(II) phosphate, cobaltocene, cobalt(II) hydroxide, cobalt(II) oxide, cobalt(III) oxide, tricobalt tetroxide, cobalt(II) acetate, and cobalt(II) lactate; and nickel compounds such as nickel(II) chloride, nickel(II) sulfate, nickel(II) sulfide, nickel(II) nitrate, nickel(II) oxalate, nickel(II) phosphate, nickelocene, nickel(II) hydroxide, nickel(II) oxide, nickel(II) acetate, and nickel(II) lactate. These may be used singly or in combination of two or more kinds.

Nitrogen-containing Organic Compound (2);

As the nitrogen-containing organic compound (2), preferred is capable of becoming a ligand that can coordinate to a metal atom in the M1-containing compound (1); and still more preferred is a compound capable of becoming a multidentate ligand (preferably, a bidentate ligand or a tridentate ligand) (compound capable of forming a chelate).

The nitrogen-containing organic compounds (2) may be used singly or in combination of two or more kinds.

The nitrogen-containing organic compound (2) preferably has a functional group such as amino group, cyano group, nitro group, amide group, azido group, aziridine group, azo group, isocyanato group, isothiocyanate group, oxime group, diazo group, or nitroso group, a ring such as pyrrole ring, porphyrin ring, imidazole ring, pyridine ring, pyrimidine ring, or pyrazine ring, imide structure, or imine structure (these functional groups, rings, and structures are also collectively referred to as "nitrogen-containing molecular group").

The nitrogen-containing organic compound (2) which containing the nitrogen-containing molecular group in the molecule is considered to more strongly coordinate to a metal atom derived from the M1-containing compound (1) after subjected to the mixing in the step 1.

Among the nitrogen-containing molecular group, amino group, imine group, amide group, pyrrole ring, pyridine ring, and pyrazine ring are more preferred; amino group, imine group, pyrrole ring, and pyrazine ring are still more preferred; and amino group and pyrazine ring are particularly preferred because of allowing the resultant oxygen reduction catalyst to have particularly high activity.

The nitrogen-containing organic compound (2) preferably has hydroxyl group, carboxyl group, formyl group, halocarbonyl group, sulfo group, phosphate group, ketone structure, ether structure, or ester structure (these are also collectively referred to as "oxygen-containing molecular group"). The nitrogen-containing organic compound (2) which contains the oxygen-containing molecular group in the molecule is considered to more strongly coordinate to a metal atom derived from the M1-containing compound (1) after subjected to the mixing in the step 1.

Among the oxygen-containing molecular group, carboxyl group and formyl group are particularly preferred because of allowing the resultant oxygen reduction catalyst to have particularly high activity.

As the compounds having the nitrogen-containing molecular group and the oxygen-containing molecular group, amino acids having amino group and carboxyl group, and derivatives thereof are preferable.

As the nitrogen-containing organic compound (2), particularly preferred is a compound which contains carbonyl group and in which a nitrogen atom is bound to α carbon of the carbonyl group. Such a compound can particularly strongly coordinate to a metal atom derived from the M1-containing compound (1).

As the amino acids, preferred are alanine, arginine, asparagine, asparagine acid, cysteine, glutamine, glutamic acid, glycine, histidine, isoleucine, leucine, lysine, methionine, phenylalanine, serine, threonine, tryptophan, tyrosine, valine, norvaline, glycylglycine, triglycine, and tetraglycine; examples thereof include, in addition to the above-described amino acids and the like, acylpyrroles such as acetylpyrrole, pyrrolecarboxylic acid, acylimidazoles such as acetylimidazole, carbonyldiimidazole, imidazolecarboxylic acid, pyrazole, acetanilide, pyrazinecarboxylic acid, piperidinecarboxylic acid, piperazinecarboxylic acid, morpholine, pyrimidinecarboxylic acid, nicotinic acid, 2-pyridinecarboxylic acid, 2,4-pyridinedicarboxylic acid, 8-quinolinol, and polyvinylpyrrolidone; and because of allowing the resultant oxygen reduction catalyst to have high activity, preferred are compounds capable of becoming a bidentate ligand: specifically, preferred are pyrrole-2-carboxylic acid, imidazole-4-carboxylic acid, 2-pyrazinecarboxylic acid, 2-piperidinecarboxylic acid, 2-piperazinecarboxylic acid, nicotinic acid, 2-pyridinecarboxylic acid, 2,4-pyridinedicarboxylic acid, and 8-quinolinol. Of the above, alanine, glycine, lysine, methionine, tyrosine, 2-pyrazinecarboxylic acid, and 2-pyridinecarboxylic acid are more preferred.

The ratio (B/A) of the total number B of carbon atoms of the nitrogen-containing organic compound (2) used in the step 1 to the total amount of the number A of atoms of a metal element of the M1-containing compound (1) used in the step 1 is preferably 2 to 200, more preferably 3 to 100, still more preferably 5 to 50, for making it easy to adjust the content of carbon atoms in the composite particles in the preferred range.

The ratio (C/A) of total number C of nitrogen atoms of the nitrogen-containing organic compound (2) used in the step 1 to the number A of atoms of a metal element of the M1-containing compound (1) used in the step 1 is preferably 1 to 28, more preferably 2 to 17, still more preferably 3 to 12, for making it easy to adjust the content of nitrogen atoms in the composite particles in the preferred range.

The range of a is preferably 0.3 or less, more preferably 0.05 to 0.2 assuming that the rate of the M1-containing compound used in the step 1 to the M2-containing compound (3) is represented by M1:M2=1: a in terms of the molar ratio (M1:M2) between the atoms of the metal element M1 and the atoms of the metal element M2 when the M1-containing compound (1) is an M1-containing compound.

Solvent;

Examples of the solvent include water, acetic acid, compounds having diketone structure (such as acetylacetone), alcohols, and mixed solvents thereof; and compounds having diketone structure are preferable in view of enabling a metal element to be stably dissolved. As the alcohols, ethanol, methanol, butanol, propanol and ethoxyethanol are preferred; and ethanol and methanol are still more preferred. It is preferable that the solvent contains an acid to increase solubility. As the acid, acetic acid, lactic acid, nitric acid, hydrochloric acid, phosphoric acid, and citric acid are preferred; and acetic acid and nitric acid are still more preferred. These may be used singly or in combination of two or more kinds.

(Step 2)

In the step 2, the solvent is removed from the catalyst precursor solution obtained in the step 1, to obtain the solid residue. A method for removing the solvent is not particularly limited but examples thereof include methods using a spray dryer, a rotatory evaporator, and the like.

Depending on solvent-removal methods or the properties of the M1-containing compound (1) or the nitrogen-containing organic compound (2), the solid residue obtained in the step 2 may have a non-uniform composition or be at a non-uniform agglomeration state. In this case, the solid residue may be mixed and crushed to obtain more uniform and finer powders and the powders may be used in the step 3, whereby a catalyst with more uniform particle diameter can be obtained.

Examples of the mixing and crushing of the solid residue include a method using a mortar, an automatic kneading mortar, or a ball mill; and when the solid residue is provided in a large amount and subjected to continuous mixing or crushing treatment, examples thereof include a method using a jet mill or the like.

(Step 3a)

In the step 3a, the solid residue obtained in the step 2 is heat-treated to obtain the heat-treated product.

Since a portion containing the metal element M1 is preferably crystalline, the temperature in the case of the heat treatment is preferably not less than a temperature at which crystallization starts. The temperature is preferably 700° C. or more, still more preferably 800° C. or more. In addition, the temperature is preferably 1400° C. or less, still more preferably 1100° C. or less, from the viewpoint of easily allowing the contents of carbon, nitrogen, and oxygen in the composite particles to be in the ranges.

Examples of methods of the heat treatment include a standing method, a stirring method, a dropping method, and a powder capturing method.

When the heat treatment is performed by the standing method, a temperature-raising rate, which is not particularly limited, is preferably around 1° C./min to 100° C./min, still more preferably 5° C./min to 50° C./min. Further, the heating time is preferably 0.1 to 20 hours, more preferably 0.5 to 10 hours, still more preferably 0.5 to 5 hours.

An electric furnace with electricity as a heat source or an infrared furnace such as an infrared gold image furnace, in which strict temperature control is possible, is preferably used for easily allowing the content of each constituent element of the composite particles to be in the range.

The heat treatment may also be performed while introducing a gas in order to adjust reaction atmosphere. As the introduced gas, a non-oxidizing gas is preferred for allowing the contents of each constituent element of the composite particles to be in the range. In this sense, the main component thereof is preferably a non-oxidizing gas. Among such non-oxidizing gases, in view of relative inexpensiveness and easy availability, a nitrogen gas, argon, helium, and a hydrogen gas are preferred; a nitrogen gas and argon are more preferred; these non-oxidizing gases may be used singly or in admixture of two or more kinds. In the case of the admixture of two or more kinds, a mixed gas of one selected from a nitrogen gas, argon, and helium with a hydrogen gas is preferable.

When the atmosphere gas in performing the heat treatment contains a hydrogen gas, the concentration of the hydrogen gas is, for example, 100% by volume or less, preferably 1 to 20% by volume, more preferably 1 to 5% by volume.

A heat-treated product obtained by the heat treatment may be used in a subsequent step without being processed or may be further crushed and then used in the subsequent step. In the present specification, an operation of making a heat-treated product fine, such as crushing or breaking, is denoted as "crushing" without particular distinction. Performing the crushing may improve the processability in using the resultant oxygen reduction catalyst to produce an electrode, and the properties of the resultant electrode. For the crushing, for example, a roll-rotating mill, a ball mill, a small-diameter ball mill (bead mill), a medium-stirring mill, an air flow crusher, a mortar, an automatic kneading mortar, a crushing tank, or a jet mill may be used.

(Step 4a)

In the step 4a, oxidation treatment of the heat-treated product obtained in the step 3a is performed with an oxidizing agent that donates oxygen atoms so that a V/G ratio is in a range of 0.10 to 0.35.

Examples of the oxidizing agent that donates oxygen atoms include hydrogen peroxide, perchloric acid, peracetic acid, water, and the like. Water vapor may be used as the water.

As mentioned above, the V/G ratio can be allowed to be in the range by adjusting the degree of oxidation. Oxidation can reduce the V/G ratio while excessive oxidation treatment rather increases the V/G ratio. The condition of the oxidation that allows the V/G ratio to be in the range may be determined by a pretest. The degree of the oxidation can be adjusted by appropriately selecting the kind of the oxidizing agent, the amount of the oxidizing agent, oxidation treatment temperature, oxidation treatment time, and the like, and it is particularly important to regulate the oxidation treatment temperature.

[Second Embodiment]

A second embodiment is an embodiment in which the steps 1 and 2 of the first embodiment are performed, followed by performing the step 4 in parallel with the step 3 simultaneously with or after the beginning of the step 3 (hereinafter, a portion in the step 3, performed in parallel with the step 4, is also referred to as "step 3b"), and an oxidizing agent used in the portion performed in parallel with the step 4 (i.e., step 3b) is preferably water. The second embodiment is an embodiment in which the step 4 is finished simultaneously with the step 3.

More specifically, a method for producing an oxygen reduction catalyst comprises:

a step 1 of mixing an M1-containing compound (1), a nitrogen-containing organic compound (2), and a solvent to obtain a catalyst precursor solution;

a step 2 of removing the solvent from the catalyst precursor solution to obtain a solid residue; and a step 3b of heat-treating the solid residue, obtained in the step 2, while introducing water, at a temperature of 700° C. to 1400° C. to obtain a heat-treated product, wherein at least one of the M1-containing compound (1) and the nitrogen-containing organic compound (2) comprises oxygen atoms.

The step 1 and the step 2 in the second embodiment are similar to the step 1 and the step 2 in the first embodiment, respectively. The portion, before the beginning of the step 4, in the step 3 in the second embodiment is similar to the step 3a in the first embodiment. The step 3b will be explained below.

(Step 3b)

In the step 3b, oxidation treatment is performed while heat-treating the solid residue obtained in the step 2. Preferably, the step 4 is performed in parallel simultaneously with the beginning of the step 3, and the solid residue obtained in the step 2 is heat-treated at a temperature of 700° C. to 1400° C. while introducing water, to obtain the heat-treated product in the step 3b. The oxidation treatment of the heat-treated product is performed simultaneously with producing the heat-treated product by the treatment. As a result, the oxygen reduction catalyst with a V/G ratio of 0.10 to 0.35 is obtained.

The conditions of the preferred heat treatment are similar to the conditions mentioned of in the step 3a of the first embodiment.

The heat treatment while introducing water is performed by mixing water into the gas atmosphere mentioned in the step 3a of the first embodiment. The amount of the water to be introduced is not particularly limited as long as the oxidation treatment proceeds but it is preferable to incorporate the water, of which the amount is a saturated water vapor content at 0° C. to 80° C., into the atmosphere gas to be introduced because of easy handling.

As the other conditions, conditions similar to those in the step 3a of the first embodiment can be adopted.

[Third Embodiment]

A third embodiment is an embodiment in which the step 4 is performed even after the end of the step 3b in the second embodiment.

In other words, in the third embodiment, a step 4c similar to the step 4a is performed after the end of the step 3b in the second embodiment. However, the step 3b is a step in which it is not necessary to perform oxidation treatment so that a V/G ratio is 0.10 to 0.35 (hereinafter also referred to as "step 3c").

An oxidizing agent used in the step 4 (step 4a) in the first embodiment and the portion (step 4c) performed after the end of the step 3 in the step 4 in the third embodiment is preferably at least one selected from hydrogen peroxide, perchloric acid, and peracetic acid because of easy handling.

The step 1 and the step 2 in the third embodiment are similar to the step 1 and the step 2 in the first embodiment, respectively.

In the third embodiment, oxidation treatment may be performed in the step 3c so that a V/G ratio is 0.10 to 0.35, and oxidation treatment may be further performed in the step 4c in order to perform adjustment to a desired D/G ratio.

The performance of the step 4 of the oxidation treatment in two stages of the step 3c and the step 4c in such a manner has an advantage that a V/G ratio is easily adjusted.

A crushing step may be set the step 3c and the step 4c. The crushing step is similar to the crushing step in the first embodiment.

<Carrying of Noble Metal Particles>

The noble metal particles (particles comprising a noble metal or an alloy of noble metals) may also be carried on the composite particles.

As a method for carrying the noble metal particles, which is not particularly limited as long as the noble metal particles can be carried to enable practical use, a method for carrying the noble metal particles using a precursor of the noble metal particles is preferred.

In this case, the precursor of the noble metal particles is a substance that can become the noble metal particles by predetermined treatment, and examples thereof include platinum chloride, iridium chloride, palladium chloride, mixtures thereof, and the like.

As a method for carrying the precursor of the noble metal particles on composite particles, which should not be particularly limited, a method to which a catalytic metal carrying technology known in the art is applied can be used. Examples include, but are not limited to: (1) a method comprising a stage of dispersing composite particles in a precursor solution of noble metal particles to be evaporated to dryness and a stage of then performing heat treatment; (2) a method comprising a stage of dispersing composite particles in a precursor colloidal solution of noble metal particles and of allowing the composite particles to adsorb the precursor colloid of the noble metal particles, whereby the noble metal particles are carried on the composite particles; (3) a method comprising a stage of adjusting the pH of a mixed liquid of a solution containing one or more precursors of noble metal particles and a dispersion liquid of composite particles, to thereby obtain noble metal oxide, hydrous oxide, and noble metal hydroxide and to allow the composite particles to adsorb them, a stage of reducing them, and optionally a stage of heat-treating them; and the like.

In the case of performing the heat treatment, treatment temperature is preferably 850° C. or less, still more preferably 700° C. or less, most preferably 600° C. or less, from the viewpoint of preventing catalytic activity from being deteriorated due to, e.g., the excessive enlargement of the particle diameter of the noble metal.

The heat treatment may also be performed while introducing a gas in order to adjust reaction atmosphere. The introduced gas is preferably a non-oxidizing gas. In this sense, the main component thereof is preferably a non-oxidizing gas. Among the non-oxidizing gases, in view of relative inexpensiveness and easy availability, nitrogen, argon, helium, and hydrogen are preferred; and nitrogen and argon are more preferred. These non-oxidizing gases may be used singly or in admixture of two or more kinds.

Before carrying the noble metal particles (particles comprising a noble metal or an alloy of noble metals), the composite particles may also be subjected to various kinds of treatment as long as the performance thereof is not lost. Examples of the treatment include reduction of unnecessary metal impurities by washing with an acid or an alkali. As the acid and the alkali used, without particular limitation, examples of the acid include hydrochloric acid, sulfuric acid, nitric acid, phosphoric acid, perchloric acid, hydrofluoric acid, hydrobromic acid, acetic acid, lactic acid, citric acid, hexafluoroantimonic acid, tetrafluoroboric acid, and the like, and examples of the alkali include sodium hydroxide, potassium hydroxide, aqueous ammonia, and the like. In addition, the composite particles may be crushed by a ball mill or the like and may have a small agglomerated particle size.

[Uses]

The oxygen reduction catalyst of the present invention is not particularly limited in use but can be preferably used in a polymer electrolyte fuel cell electrode catalyst, an air cell electrode catalyst, or the like.

<Ink for Producing Fuel Cell Catalyst Layer, and Fuel Cell Catalyst Layer>

A fuel cell catalyst layer can be produced from the oxygen reduction catalyst.

Examples of the fuel cell catalyst layer include anode catalyst layers and cathode catalyst layers, and the oxygen reduction catalyst is preferably used in cathode catalyst layers because of having excellent durability and high oxygen reduction reaction activity.

The fuel cell catalyst layer contains the oxygen reduction catalyst and a polymer electrolyte. In order to more reduce electrical resistance in the catalyst layer, electron conductive particles may be further contained in the catalyst layer.

Examples of materials of the electron conductive particles include carbon, conductive polymers, conductive ceramics, metals, and conductive inorganic oxides such as tungsten oxide and iridium oxide, and these materials can be used singly or in combination with one another. In particular, carbon or a mixture of carbon and other electron conductive particles is preferred, since the electron conductive particles comprising carbon have a large specific surface area, those having a small particle diameter are easily available inexpensively, and they are excellent in chemical resistance.

Examples of the carbon include carbon black, graphite, activated carbon, carbon nanotube, carbon nanofiber, carbon nanohorn, fullerene, porous carbon, graphene, and the like. If the particle diameter of the electron conductive particles comprising carbon is excessively small, an electron conductive path is not readily formed, while if the particle diameter is excessively large, the fuel cell catalyst layer tends to have decreased gas diffusion properties or the catalyst usage rate tends to be lowered, and, therefore, the particle diameter of the electron conductive particles comprising carbon is preferably 10 to 1000 nm, more preferably 10 to 100 nm.

When the electron conductive particles comprise carbon, the mass ratio of the oxygen reduction catalyst to the electron conductive particles (catalyst: electron conductive particles) is preferably 1:1 to 100:1, still more preferably 2:1 to 100:1.

The fuel cell electrode catalyst layer typically comprises a polymer electrolyte. The polymer electrolytes are not particularly limited as long as being those commonly used in fuel cell catalyst layers. Specific examples thereof include perfluorocarbon polymers having a sulfonic acid group (such as NAFION (registered trademark)), hydrocarbon polymer compounds having a sulfonic acid group, polymer compounds doped with inorganic acids such as phosphoric acid, organic/inorganic hybrid polymers partially substituted with proton conductive functional groups, and proton conductors comprising a polymer matrix impregnated with a phosphoric acid solution or a sulfuric acid solution. Of these, NAFION is preferable. Examples of the source of NAFION in forming the fuel cell catalyst layer include a 5% NAFION solution (DE521, DuPont) and the like.

A method for forming the fuel cell catalyst layer is not particularly limited. Examples thereof include a method for applying a suspension, in which the above-mentioned constituent materials of the fuel cell catalyst layer are dispersed in a solvent, to an electrolyte membrane or a gas diffusion layer as described later. Examples of the application method include dipping, screen printing, roll coating, spraying, bar coater application, and the like. In addition, examples thereof include a method comprising forming a fuel cell catalyst layer on a substrate by an application method or a filtration method with the suspension in which the above-mentioned constituent materials of the fuel cell catalyst layer are dispersed in a solvent (also referred to as "ink for producing fuel cell catalyst layer" in the present invention), followed by forming the fuel cell catalyst layer on an electrolyte membrane by a transfer method.

<Fuel Cell Electrode>

The fuel cell electrode of the present invention comprises the fuel cell catalyst layer and optionally a gas diffusion layer. Hereinafter, an electrode containing an anode catalyst layer is referred to as an anode while an electrode containing a cathode catalyst layer is referred to as a cathode.

The gas diffusion layer is a layer that is porous and assists diffusion of a gas. The gas diffusion layer is not limited as long as having electron conductivity, high gas diffusion properties, and high corrosion resistance. Carbon-based porous materials such as carbon paper and carbon cloth, and stainless steel and anticorrosive-coated aluminum foils for weight reduction are generally used as the gas diffusion layer.

A layer with water repellency may also be interposed between the catalyst layer and the gas diffusion layer.

<Membrane Electrode Assembly>

A membrane electrode assembly comprises a cathode catalyst layer, an anode catalyst layer, and a polymer electrolyte membrane interposed between both catalyst layers. The membrane electrode assembly may also have a gas diffusion layer. In this case, a fuel cell catalyst layer known in the art, for example, a fuel cell catalyst layer containing a platinum-carried carbon catalyst instead of the oxygen reduction catalyst can be used as the anode catalyst layer.

Hereinafter, in the present specification, the membrane electrode assembly may be referred to as "MEA".

As the polymer electrolyte membrane, for example, a polymer electrolyte membrane in which a perfluorosulfonic acid-based polymer is used, a polymer electrolyte membrane in which hydrocarbon-based polymer is used, or the like is generally used, and there may also be used a membrane in which a polymer macroporous membrane is impregnated with liquid electrolyte, a membrane in which a porous body is filled with polymer electrolyte, or the like.

The membrane electrode assembly can be obtained by forming the fuel cell catalyst layer on both surfaces of the electrolyte membrane. When the membrane electrode assembly has a gas diffusion layer, the gas diffusion layer is formed on the further outside of the fuel cell catalyst layer. The membrane electrode assembly having the gas diffusion layer can be obtained by forming a cathode catalyst layer on one surface of the gas diffusion layer, forming an anode catalyst layer on the other surface of the gas diffusion layer, sandwiching both surfaces of the electrolyte membrane between the two gas diffusion layers so that the cathode catalyst layer and the anode catalyst layer are internal sides, and, for example, hot-pressing the resultant.

<Uses of Membrane Electrode Assembly>

The membrane electrode assembly has high catalytic activity and start/stop durability and can be therefore preferably used in uses of polymer solid oxide fuel cells or air cells.

A fuel is not particularly limited if being capable of generating protons in an anode. Examples of the fuel include hydrogen, alcohols such as methanol, and saccharides such as glucose, and hydrogen and methanol are preferable. Water may be mixed into the fuel, and the water is preferably water vapor when the fuel is supplied in a gas.

Oxygen is preferable as an oxidizing agent, and the concentration of oxygen supplied to a cathode is not particularly limited. In the case of the supply in a gas, nitrogen and water vapor may be mixed into the oxidizing agent. Air may be used as a gas supplied to the cathode.

When the fuel or the oxidizing agent is supplied in a gas, the gas may be a gas at atmospheric pressure or a pressurized gas.

Since it is necessary that a solid electrolyte is wet with water in order to secure proton conductivity when the fuel cell is operated, the fuel cell is operated with water vapor mixed into a gas. The fuel cell is generally operated using a gas into which a saturated water vapor content at cell temperature during the operation is introduced.

The oxygen reduction catalyst of the present invention comprises composite particles containing a portion comprising an inorganic metal compound. The portion comprising the inorganic metal compound easily retains water in operation of a fuel cell because of having high hydrophilicity. Therefore, the humidity of an introduced gas can be lowered when a fuel cell in which the oxygen reduction catalyst of the present invention is used is operated. Since the fuel cell can be operated at low humidity, a system in which the fuel cell is used can be a system in which a gas humidifier is not used, or adjustment of humidity in operation of the fuel cell can be simplified.

<Specific Examples of Articles Comprising Fuel Cell Described Above>

Specific examples of articles that can comprise the fuel cell are not particularly limited if being articles using electricity but include architectural structures such as buildings, houses and tents, illumination equipment such as fluorescent light, LEDs and the like, organic EL, street light, interior illumination and traffic light, machinery, automotive devices including vehicles, household appliances, agricultural equipment, electronic devices, mobile information terminals including mobile phones, beauty instruments, portable tools, sanitary goods such as bathroom goods and lavatory goods, furniture, toys, ornaments, bulletin boards, cool boxes, outdoor goods such as exterior generators, teaching materials, artificial flowers, items of artwork, power source for cardiac pacemakers and power source for heating and cooling apparatuses equipped with Peltier elements. A system in which the fuel cell is combined with a secondary battery or a capacitor is preferred for stably using electricity.

EXAMPLES

The present invention will be described below based on examples but the present invention is not limited to these examples.

[Production and Measurement of Oxygen Reduction Catalyst]

1. Elemental Analysis;

Carbon: About 0.1 g of a sample was weighed and measured with EMIA-110 manufactured by HORIBA, Ltd. Nitrogen/oxygen: About 0.1 g of a sample was weighed, was sealed in Ni-Cup, and was thereafter measured with TC600 manufactured by LECO.

Metal element: About 0.1 g of a sample was weighed on a platinum dish, an acid was added to the sample, and the resultant was decomposed by heating. This product decomposed by heating was quantitatively determined, was thereafter appropriately diluted, and was quantitated using ICP-OES (VISTA-PRO manufactured by SII) or ICP-MS (HP7500 manufactured by Agilent).

2. Powder X-ray Diffractometry;

Samples were subjected to powder X-ray diffraction analysis using X'Pert PRO MRD manufactured by PANalytical B.V.

The details of the measurement conditions are as follows.

X-ray output: (Cu-Kα): 45 kV, 40 mA
Scanning axis: θ/2θ
Measurement range (2θ): 10.00° to 89.98°
Measurement mode: FT
Reading width: 0.02°
Sampling time: 0.70 sec
DS, SS, RS: 0.5°, 0.5°, 0.15 mm
Goniometer radius: 240 mm With regard to the counting of diffraction peaks in the powder X-ray diffractometry for each sample, a signal that was able to be detected with a signal (S) to noise (N) ratio (S/N) of 2 or more was regarded as a single peak. The noise (N) was the width of the baseline.

(Calculation of Crystallite Size)

With regard to a peak caused by a portion comprising an inorganic metal compound, the peak half height width B (radian) of the diffraction line of a principal peak was determined by a powder X-ray diffraction Rietveld analysis program ("HighScore Plus.", manufacturer: Panalytical. B.V.), and the average value D of the sizes of crystallites in a direction perpendicular to the crystal plane of the portion comprising an inorganic metal compound was calculated based on the Scherrer equation: $D=K\lambda/B \cos\theta$ (constant K is 0.9, $\lambda$ is an X-ray wavelength (nm), and $\theta$ is a diffraction angle (degrees)).

3. Raman Spectrometry;

Microscopic Raman measurement was performed with NRS-5100 manufactured by JASCO Corporation. Before the sample measurement, the apparatus was calibrated using a silicon substrate for reference. The sample measurement was performed in a lattice measurement mode, and the measurement was performed five times in total (45 places in total) at sample positions different from each other assuming that measurement of nine places was performed one time. Spectra obtained in the measurement were averaged as a final result. The excitation wavelength was 532 nm, and the exposure time and the total number of times were 3 seconds and 5 times per laser irradiation point, respectively. The measurement range was 850 to 2000 $cm^{-1}$.

The obtained spectra were analyzed using Spectra Manager Version 2 manufactured by JASCO Corporation. In other words, appropriate baseline correction was performed, and the V/G ratio was then calculated.

4. BET Specific Surface Area Measurement;

The specific surface area of 0.15 g of a collected sample was measured by a fully-automated BET specific surface area measuring apparatus MACSORB (manufactured by Mountech Co., Ltd.). The pretreatment time and the pretreatment temperature were set at 30 minutes and 200° C., respectively.

5. Observation with Transmission Electron Microscope;

Observation with a transmission electron microscope (TEM) was performed using H9500 (acceleration voltage of 300 kV) manufactured by Hitachi, Ltd. The observation sample was produced by dropwise adding, on a microgrid for TEM observation, a dispersion liquid obtained by ultrasonically dispersing a sample powder in ethanol. In addition, energy dispersive X-ray spectroscopy (EDX analysis) was performed using HD2300 (acceleration voltage of 200 kV) manufactured by Hitachi, Ltd.

6. Evaluation of Oxygen Reduction Reaction Activity Using Electrochemical Measurement;

(1) Production of Electrode;

In 1.2 ml of a solution in which isopropyl alcohol and pure water were mixed at a mass ratio of 1:1, 30 mg of an oxygen reduction catalyst and 7.5 mg of carbon black (KetjenBlack EC-600JD, manufactured by Lion Corporation) were put, irradiated with ultrasonic waves, dispersed, and mixed. To this suspension, 37.5 μl of a 5% NAFION solution (DE521, manufactured by DuPont) was added and further mixed. While mixing this suspension, 10 μL of the suspension was collected, quickly dropwise added onto a glassy carbon electrode (diameter: 5.2 mm), and dried at 120° C. for 5 minutes. By the drying, a powder layer (catalyst layer) for evaluating an oxygen reduction reaction activity was formed on the glassy carbon electrode. The dropwise addition and drying operation was performed until 1.0 mg of the catalyst layer was formed on the surface of the carbon electrode. The weight of the catalyst layer was measured based on a variation in the weight of the glassy carbon electrode before and after the formation of the catalyst layer.

(2) Evaluation of Oxygen Reduction Reaction Activity;

The electrode produced in the above (1) (the glassy carbon electrode on which the catalyst layer was formed) was polarized at 30° C. and a potential scanning rate of 5 mV/sec in 0.5 mol/L of an aqueous sulfuric acid solution in oxygen atmosphere and nitrogen atmosphere to measure a current-potential curve. In this case, a reversible hydrogen electrode in an aqueous sulfuric acid solution having the same concentration was used as a reference electrode.

In the measurement results of the current-potential curve described above, a difference between a reduction current in the oxygen atmosphere and a reduction current in the nitrogen atmosphere at 0.75 V (vs RHE) was calculated, and the value was further divided by an electrode area, to obtain a value, which was regarded as an oxygen reduction current density (mA/cm$^2$). The catalytic activity of the produced electrode was evaluated based on the oxygen reduction current density. The more the oxygen reduction current density is, the higher the oxygen reduction activity in the electrode is.

Examples 1-1 to 9-1, Comparative Examples 1-1 to 2-1, 6-1 to 8-1

<Synthesis of Precursor>

The kinds and amounts of raw materials used in each example are listed in Table 4.

In an egg-type flask, a stirring bar and a solvent (1) was loaded, and the solvent (1) was ice-cooled while being stirred with a magnetic stirrer. To the resultant, an M1-containing compound (1) and a solvent (2) were slowly added in this order, to produce a solution (M1 solution) of a metal-containing compound containing a metal element M1. When a plurality of kinds of compounds were used as the M1-containing compounds (1), they were added in order listed in Table 4 (in order from a lower numeral to a higher numeral).

When a stirring bar, a nitrogen-containing organic compound (2), and a metal element M2 were added into another egg-type flask, an M2-containing compound (3) was further loaded, a solvent (3) was then added, and the resultant was stirred with a magnetic stirrer to produce a solution containing the nitrogen-containing organic compound (2).

To the solution containing the nitrogen-containing organic compound (2), the M1 solution was slowly added at room temperature. After the addition, stirring was continued for 30 minutes to obtain a precursor solution.

The temperature of a water bath was set at about 80° C., and the solvent was evaporated using a rotary vacuum evaporator while heating and stirring the precursor solution. A solid residue obtained by evaporating the solvent was finely and homogeneously squeezed with a mortar made of agate, to obtain a powder (hereinafter also referred to as "precursor").

TABLE 4

| | Amount (Weight (g)) of Each Added Constituent | | | | | | | | |
|---|---|---|---|---|---|---|---|---|---|
| | | M1-containing compound (1) | | | | | Nitrogen-containing | | Solvent |
| Order of addition of metal-containing compounds (1) | Solvent (1) Acetylacetone | 1 Titanium tetra isopropoxide | 2 Tetra-n-butoxy zirconium | 3 Niobium penta-ethoxide | 4 Tantalum penta-ethoxide | Solvent (2) Acetic acid | organic compound (2) Glycine | M2-containing compound (3) Iron(II) acetate | (3) Ion-exchanged water |
| Precursor (1) | 20.8 | 19.4 | | 21.8 | | 134.3 | 41.1 | 2.38 | 480 |
| Precursor (2) | 20.8 | 19.4 | 60.5 | | | 134.3 | 41.1 | 0.00 | 480 |
| Precursor (3) | 20.8 | | 60.5 | 21.8 | | 134.3 | 41.1 | 2.38 | 480 |
| Precursor (4) | 18.7 | | | 19.6 | 25.0 | 120.6 | 37.1 | 2.15 | 432 |
| Precursor (5) | 10.4 | 19.4 | | 1.4 | | 67.1 | 21.1 | 0.60 | 240 |

TABLE 4-continued

Amount (Weight (g)) of Each Added Constituent

| Order of addition of metal-containing compounds (1) | Solvent (1) Acetylacetone | M1-containing compound (1) | | | | Solvent (2) Acetic acid | Nitrogen-containing organic compound (2) Glycine | M2-containing compound (3) Iron(II) acetate | Solvent (3) Ion-exchanged water |
|---|---|---|---|---|---|---|---|---|---|
| | | 1 Titanium tetra isopropoxide | 2 Tetra-n-butoxy zirconium | 3 Niobium penta-ethoxide | 4 Tantalum penta-ethoxide | | | | |
| Precursor (6) | 10.2 | 17.1 | 2.6 | | | 65.0 | 20.1 | 0.58 | 240 |
| Precursor (7) | 9.4 | | | 20.0 | | 67.1 | 6.3 | 1.09 | 240 |
| Precursor (8) | 9.4 | | | 20.0 | | 67.1 | 12.6 | 1.09 | 240 |
| Precursor (9) | 5.0 | | 25.6 | | | 33.6 | 10.0 | 1.74 | 120 |

<Synthesis of Composite Particles>

(Heat Treatment Step)

The precursor was put in a tubular furnace made of quartz at room temperature, and the interior of the system was thoroughly replaced with mixed gas atmosphere of hydrogen and nitrogen, containing 4% by volume of hydrogen. The temperature of the tubular furnace was increased to heat treatment temperature while introducing atmosphere gas, and the tubular furnace was retained at the heat treatment temperature for predetermined time, then left stand to cool, and air-cooled when becoming at 500° C. or less. When the tubular furnace became at 50° C. or less, the introduction of the atmosphere gas was stopped, and the heat-treated product was taken out of the tubular furnace.

When an atmosphere gas containing water was used, a mixed gas of hydrogen and nitrogen, containing 4% by volume of hydrogen, was passed through a bubbler containing ion-exchanged water maintained at constant temperature (60° C.), to allow the atmosphere gas to contain water (water vapor).

Heat treatment conditions are listed in Table 5.

(Crushing Step)

With a planetary ball mill (P-7, manufactured by FRITSCH JAPAN CO., LTD.), 1 g of the heat-treated product was crushed, and the resultant was filtered and dried at 80° C. to obtain a powder (hereinafter also referred to as "composite particles").

Crushing conditions were as follows: in a container, 10 ml of a solvent and a zirconia ball having a diameter of 0.5 mm were loaded together with the heat-treated product, and the heat-treated product was crushed at a rotation number of 700 rpm for 10 minutes. As the solvent, 2-propanol was used.

The results of, e.g., elemental analysis of the composite particles are listed in Table 6.

Figure 5:
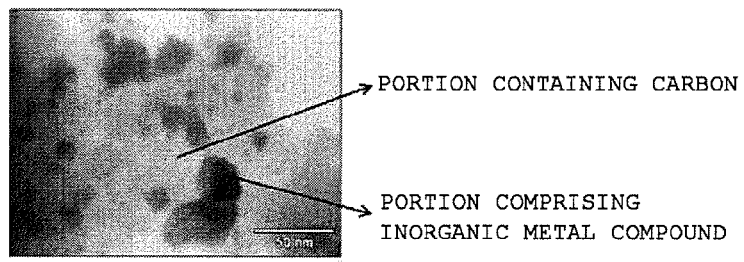
FIG. 5 is the image of composite particles (1) in Example 1-1, observed with a transmission electron microscope (TEM).
Figure 6:
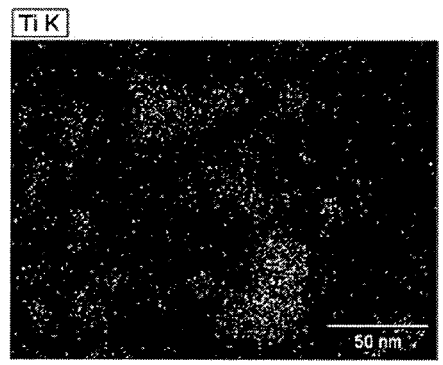
FIG. 6 is the Ti mapping of composite particles (1) in Example 1-1 by energy dispersive X-ray spectroscopy (EDX).
Figure 7:
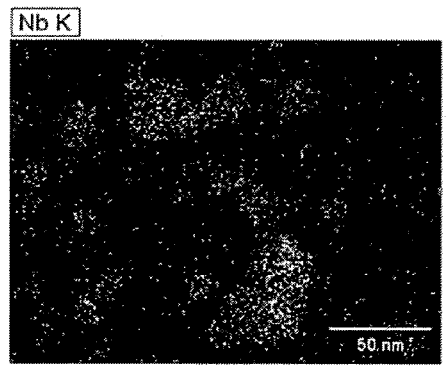
FIG. 7 is the Nb mapping of composite particles (1) in Example 1-1 by energy dispersive X-ray spectroscopy (EDX).
Figure 8:
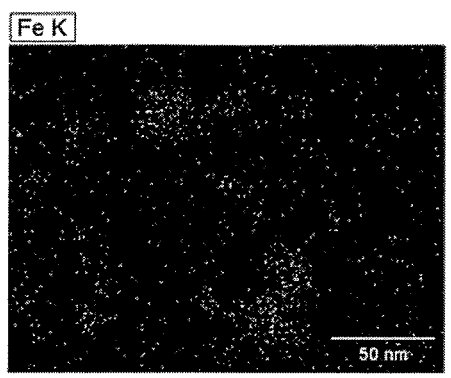
FIG. 8 is the Fe mapping of composite particles (1) in Example 1-1 by energy dispersive X-ray spectroscopy (EDX).
Figure 9:
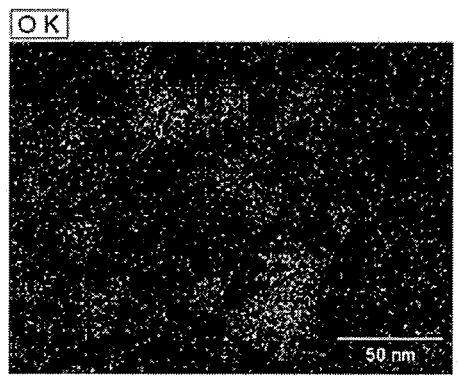
FIG. 9 is the O mapping of composite particles (1) in Example 1-1 by energy dispersive X-ray spectroscopy (EDX).

FIG. 5 illustrates the TEM observation image of composite particles (1) in Example 1-1. In addition, each of FIGS. 6 to 9 illustrates the results of the EDX mapping of Ti, Nb, Fe, or O. From the TEM observation image, "portion comprising inorganic metal compound" can be confirmed to be particulate. The EDX analysis of "portion containing carbon" in FIG. 5 was able to show a confirmation that C was contained as a main component. The combination of the TEM observation image, the EDX analysis of "portion containing carbon", and the results of the EDX mapping shows that the composite particles (1) are composite particles comprising "portion comprising inorganic metal compound" and "portion containing carbon" and that Ti, Nb, Fe, and O are abundantly distributed in "portion comprising inorganic metal compound" and "portion containing carbon" contains C as the main component.

Comparative Example 11-1

Particles (C11) were obtained according to a method for producing "carrier for carrying catalyst IK (Co) 1000° C. AW" described in Example 1 of Patent Literature 2 (in this regard, however a heat-treated product was ground in a manner similar to the crushing step of Example 1-1 as described above). The elemental analysis of the particles (C11) showed that the contents of cobalt, carbon, nitrogen, and oxygen were 0.83 mass %, 95 mass %, 0.5 mass %, and 0.9 mass %, respectively. The analysis results of the carbonized material (C11) are listed in Table 6.

Comparative Example 12-1

According to the description of "4-1. Preparation of Catalyst" in Example 4 of Patent Literature 3, "catalyst (4)" was produced. A crushing step was performed in a manner similar to that in Example 1-1 except that the heat-treated product was changed to 1 g of "catalyst (4)" and acetonitrile was used as a solvent, to obtain particles (C12). The analysis results of the particles (C12) are listed in Table 6.

Comparative Example 13-1

According to the description of "1. Preparation of Carrier for Catalyst" in Example 1 of International Publication No. WO 2009/104500, "carrier (1) for catalyst" was produced. A crushing step was performed in a manner similar to that in Example 1-1 except that the heat-treated product was changed to 1 g of "carrier (1) for catalyst" and acetonitrile was used as a solvent, to obtain particles (C13). The analysis results of the particle (C13) are listed in Table 6.

TABLE 5

| Example, etc. | Composite particles, etc. | Precursor | Amount (g) of loaded precursor | Heat treatment temperature (° C.) | Retention time (min) | Temperature-raising rate (° C./min) | Presence or absence of water in atmosphere gas | Flow rate of atmosphere gas (ml/min) |
|---|---|---|---|---|---|---|---|---|
| Example 1-1 | Composite particles (1) | Precursor (1) | 10 | 950 | 180 | 20 | Present | 100 |
| Example 2-1 | Composite particles (2) | Precursor (2) | 10 | 950 | 180 | 20 | Present | 100 |
| Example 3-1 | Composite particles (3) | Precursor (3) | 10 | 950 | 180 | 20 | Present | 100 |
| Example 4-1 | Composite particles (4) | Precursor (4) | 10 | 950 | 180 | 20 | Present | 100 |
| Example 5-1 | Composite particles (5) | Precursor (5) | 10 | 950 | 180 | 20 | Present | 100 |
| Example 6-1 | Composite particles (6) | Precursor (6) | 10 | 950 | 180 | 20 | Present | 100 |
| Example 7-1 | Composite particles (7) | Precursor (7) | 10 | 950 | 180 | 20 | Present | 100 |
| Example 8-1 | Composite particles (8) | Precursor (8) | 10 | 950 | 180 | 20 | Present | 100 |
| Example 9-1 | Composite particles (9) | Precursor (9) | 10 | 950 | 180 | 20 | Present | 100 |
| Comparative Example 1-1 | Composite particles (C1) | Precursor (1) | 1.8 | 890 | 30 | 10 | Absent | 20 |
| Comparative Example 2-1 | Composite particles (C2) | Precursor (2) | 1.8 | 890 | 30 | 10 | Absent | 20 |
| Comparative Example 6-1 | Composite particles (C6) | Precursor (6) | 40 | 950 | 90 | 10 | Absent | 220 |
| Comparative Example 7-1 | Composite particles (C7) | Precursor (7) | 1.8 | 900 | 30 | 10 | Absent | 20 |
| Comparative Example 8-1 | Composite particles (C8) | Precursor (8) | 1.8 | 900 | 30 | 10 | Absent | 20 |

TABLE 6

| Example, etc. | Composite particles, etc. | Elemental analysis (mol ratio) | | | | | | | | | Oxygen Reduction Reaction Activity | Raman spectrum | | XRD Crystallite | |
|---|---|---|---|---|---|---|---|---|---|---|---|---|---|---|---|
| | | Ti | Zr | Nb | Ta | M1 in total | M2 Fe | C | N | O | I at 0.75 V (mA/cm$^2$) | V/G ratio | D/G ratio | size (nm) | BET (m$^2$/g) |
| Example 1-1 | Composite particles (1) | 0.50 | | 0.50 | | 1.00 | 0.10 | 4.20 | 0.28 | 1.80 | 0.28 | 0.34 | 1.05 | 26 | 190 |
| Example 2-1 | Composite particles (2) | 0.30 | 0.70 | | | 1.00 | | 2.10 | 0.21 | 1.70 | 0.33 | 0.32 | 1.10 | 16 | 163 |
| Example 3-1 | Composite particles (3) | | 0.70 | 0.30 | | 1.00 | 0.06 | 2.50 | 0.21 | 1.60 | 0.61 | 0.27 | 1.03 | 10 | 154 |
| Example 4-1 | Composite particles (4) | | | 0.50 | 0.50 | 1.00 | 0.10 | 4.40 | 0.17 | 2.10 | 0.57 | 0.34 | 0.95 | 15 | 176 |
| Example 5-1 | Composite particles (5) | 0.94 | | 0.06 | | 1.00 | 0.05 | 4.10 | 0.09 | 2.20 | 0.52 | 0.28 | 1.10 | 31 | 145 |

TABLE 6-continued

| Example, etc. | Composite particles, etc. | Elemental analysis (mol ratio) | | | | | | | | | Oxygen Reduction Reaction Activity I at 0.75 V (mA/cm²) | Raman spectrum | | XRD Crystallite size (nm) | BET (m²/g) |
|---|---|---|---|---|---|---|---|---|---|---|---|---|---|---|---|
| | | M1 | | | | M1 in total | M2 Fe | C | N | O | | V/G ratio | D/G ratio | | |
| | | Ti | Zr | Nb | Ta | | | | | | | | | | |
| Example 6-1 | Composite particles (6) | 0.90 | 0.10 | | | 1.00 | 0.05 | 4.10 | 0.31 | 1.60 | 0.47 | 0.30 | 1.10 | 17 | 155 |
| Example 7-1 | Composite particles (7) | | | 1.00 | | 1.00 | 0.11 | 1.40 | 0.13 | 2.10 | 0.42 | 0.25 | 0.95 | 20 | 151 |
| Example 8-1 | Composite particles (8) | | | 1.00 | | 1.00 | 0.12 | 2.30 | 0.22 | 1.80 | 0.57 | 0.34 | 1.06 | 18 | 149 |
| Example 9-1 | Composite particles (9) | | 1.00 | | | 1.00 | 0.15 | 1.90 | 0.12 | 1.70 | 0.42 | 0.30 | 0.98 | 16 | 186 |
| Comparative Example 1-1 | Composite particles (C1) | 0.50 | | 0.50 | | 1.00 | 0.10 | 4.70 | 0.45 | 1.60 | 0.42 | 0.56 | 1.01 | 8 | 238 |
| Comparative Example 2-1 | Composite particles (C2) | 0.30 | 0.70 | | | 1.00 | | 2.50 | 0.32 | 1.70 | 0.47 | 0.57 | 0.95 | 15 | 195 |
| Comparative Example 6-1 | Composite particles (C6) | 0.92 | 0.08 | | | 1.00 | 0.05 | 4.18 | 0.39 | 1.60 | 0.60 | 0.40 | 1.10 | 12 | 201 |
| Comparative Example 7-1 | Composite particles (C7) | | | 1.00 | | 1.00 | 0.13 | 1.57 | 0.16 | 2.35 | 0.28 | 0.51 | 0.92 | 10 | 171 |
| Comparative Example 8-1 | Composite particles (C8) | | | 1.00 | | 1.00 | 0.12 | 2.49 | 0.31 | 1.76 | 0.65 | 0.53 | 0.95 | 13 | 214 |
| Comparative Example 10-2 | — | — | — | — | — | — | — | — | — | — | — | 036*[1] | 1.19*[1] | — | 344*[1] |
| Comparative Example 11-1 | Particles (C11) | — | — | — | — | — | — | — | — | — | — | 0.16 | 0.86 | *[2] | 178 |
| Comparative Example 12-1 | Particles (C12) | | | 1.00 | | 1.00 | | 0.51 | 0.12 | 1.66 | 0.13 | 0.63 | 0.91 | — | 25 |
| Comparative Example 13-1 | Particles (C13) | | | | 1.00 | 1.00 | | 0.53 | 0.41 | 0.76 | — | 0.65 | 1.11 | — | 6 |

*[1] Measurement results of platinum-carried particles (C10) in Comparative Example 10-2
*[2] Any crystals of the inorganic metal compound were not observed.

Example 1-2

<Production of Oxygen Reduction Catalyst Comprising Noble Metal-Carried Composite Particles>

To 1250 ml of distilled water, 1.00 g of the composite particles (hereinafter also referred to as "composite particles (1)") produced in Example 1-1 and 363 mg of sodium carbonate (manufactured by Wako Pure Chemical Industries, Ltd.) were added, and the resultant was shaken with an ultrasonic wave washer for 30 minutes. The resultant suspension was stirred for 30 minutes while maintaining the temperature of the liquid at 80° C. in a water bath. To the resultant, 30 mL of distilled water containing 0.660 g of platinum chloride hexahydrate (manufactured by Wako Pure Chemical Industries, Ltd.) (equivalent to 0.250 g of platinum) was dropwise added in 10 minutes while maintaining the temperature of the liquid at 80° C. Then, the resultant was stirred at a liquid temperature of 80° C. for 2 hours. Then, for the resultant suspension, 21.5 ml of an aqueous formaldehyde solution of 37% (manufactured by Wako Pure Chemical Industries, Ltd.) was dropwise added to the above-described suspension in 5 minutes. Then, the resultant was stirred for 1 hour while maintaining the temperature of the liquid at 80° C. After the end of the stirring, the resultant suspension was cooled, and a black powder was filtered by filtration and was dried.

The resultant powder was put in a tubular furnace, heated to 600° C. at a temperature-raising rate of 10° C./min under mixed gas atmosphere of hydrogen and nitrogen, containing 4% by volume of hydrogen, heat-treated at 600° C. for 1 hour, and then left stand to cool to room temperature, to obtain platinum-carried particles (1).

Using the platinum-carried particles (1), a membrane electrode assembly for a fuel cell mentioned later was produced, and the power generation properties thereof were evaluated. The results are listed in Table 7.

Examples 2-2 to 9-2, Comparative Examples 1-2 to 2-2

An operation similar to that in Example 1-2 was performed except that the composite particles (1) were changed to any of composite particles (2) to (9) and composite particles (C1) to (C2), to produce each of platinum-carried particles (2) to (9) and (C1) to (C2).

Evaluation of power generation properties mentioned later and the like were performed using each of the platinum-carried particles. The measurement results are listed in Table 7.

Comparative Example 10-2

Evaluation of power generation properties mentioned later and the like were performed using a platinum-carried carbon catalyst (TEC10E50E, hereinafter also referred to as "platinum-carried particles (C10)") manufactured by TANAKA KIKINZOKU KOGYO K.K. The results are listed in Table 7. In addition, the results of measurement of the Raman spectrum and BET specific surface area of the platinum-carried particles (C10) in a manner similar to that of the composite particles (1) are listed in the row of "Comparative Example 10-2" in Table 6.

Comparative Example 11-2

An operation similar to that in Example 1-2 was performed except that the composite particles (1) were changed to 1.00 g of particles (C11), to produce platinum-carried particles (C11). In addition, evaluation of power generation properties mentioned later and the like were performed using the platinum-carried particles (C11). The measurement results are listed in Table 7.

Comparative Example 12-2

An operation similar to that in Example 1-2 was performed except that the composite particles (1) were changed to 1.00 g of particles (C12), to produce platinum-carried particles (C12). In addition, evaluation of power generation properties mentioned later and the like were performed using the platinum-carried particles (C12). The measurement results are listed in Table 7.

Comparative Example 13-2

According to the description of "2. Preparation of Catalyst" in Example 1 of International Publication No. WO 2009/104500, a platinum-carried carrier (hereinafter referred to as "platinum-carried particles (C13)") was produced. In addition, evaluation of power generation properties mentioned later and the like were performed using the platinum-carried particles (C13). The measurement results are listed in Table 7.

[Production of Membrane Electrode Assembly for Fuel Cell and Evaluation of Power Generation Properties Thereof]
<Production of Membrane Electrode Assembly>
(1) Preparation of Cathode Ink;
Inks A to C for a cathode were prepared as follows.
(1-1) Cathode Ink A
In a sample bottle 1, 0.25 g of the oxygen reduction catalyst (platinum-carried particles) was put, 6 mL of ion-exchanged water was added and stirred, and 6 mL of 2-propropanol was further added and stirred.

In a sample bottle 2, 0.5 g of a 5% NAFION solution was put and diluted with 12 ml of a mixed solution of 2-propanol and ion-exchanged water (volume ratio of 1:1).

The total amount of the solution in the sample bottle 2 was added to the sample bottle 1 at a rate of 1 ml/min while subjecting the sample bottle 1 to ultrasonication. Then, 4 ml of a mixed solution of 2-propanol and ion-exchanged water (volume ratio of 1:1) was added to the sample bottle 1, and the resultant was subjected to ultrasonication for 30 minutes to disperse the oxygen reduction catalyst (platinum-carried particles), whereby the ink A for a cathode was prepared.

(1-2) Cathode Ink B
In a sample bottle 1, 0.25 g of the oxygen reduction catalyst (platinum-carried particles) and 0.0625 g of graphitized carbon black (GrCB-K, manufactured by Showa Denko K.K.) as an electronically conductive material were put, 6 mL of ion-exchanged water was added and stirred, and 6 mL of 2-propropanol was further added and stirred.

In a sample bottle 2, 3.75 g of a 5% NAFION solution was put and diluted with 12 ml of a mixed solution of 2-propanol and ion-exchanged water (volume ratio of 1:1).

The total amount of the solution in the sample bottle 2 was added to the sample bottle 1 at a rate of 1 ml/min while subjecting the sample bottle 1 to ultrasonication. Then, 4 ml of a mixed solution of 2-propanol and ion-exchanged water (volume ratio of 1:1) was added to the sample bottle 1, and the resultant was subjected to ultrasonication for 30 minutes to disperse the oxygen reduction catalyst (platinum-carried particles), whereby the ink B for a cathode was prepared.

(1-3) Cathode Ink C
In a sample bottle 1, 0.25 g of a platinum-carried carbon catalyst (TEC10E50E) (platinum-carried particles (C10)) manufactured by TANAKA KIKINZOKU KOGYO K.K. was put, 6 mL of ion-exchanged water was added and stirred, and 6 mL of 2-propropanol was further added and stirred.

In a sample bottle 2, 2.08 g of a 5% NAFION solution was put and diluted with 12 ml of a mixed solution of 2-propanol and ion-exchanged water (volume ratio of 1:1).

The total amount of the solution in the sample bottle 2 was added to the sample bottle 1 at a rate of 1 ml/min while subjecting the sample bottle 1 to ultrasonication. Then, 4 ml of a mixed solution of 2-propanol and ion-exchanged water (volume ratio of 1:1) was added to the sample bottle 1, and the resultant was subjected to ultrasonication for 30 minutes to disperse the oxygen reduction catalyst (platinum-carried particles), whereby the ink C for a cathode was prepared.

(2) Production of Cathode;
A gas diffusion layer (carbon paper (TGP-H-060, manufactured by Toray Industries, Inc.)) was immersed in acetone (manufactured by Wako Pure Chemical Industries, Ltd.) for 30 seconds and degreased, thereafter dried, and then immersed in an aqueous polytetrafluoroethylene (PTFE) solution of 10% for 30 seconds.

The immersed product was dried at room temperature and was then heated at 350° C. for 1 hour to obtain a water-repellent gas diffusion layer having PTFE dispersed in the carbon paper (hereinafter also referred to as "GDL").

The GDL was formed into the size of 5 cm×5 cm, one surface thereof was coated with the cathode ink using an automatic spray-coating apparatus (manufactured by San-Ei Tech Ltd.) at 80° C., platinum was formed to have an amount of 0.1 mg/cm$^2$, and a cathode was produced. A cathode catalyst layer was formed on the coated surface.

The amount of platinum per unit area in the cathode catalyst layer was calculated from a variation in mass before and after the coating and the composition of the cathode ink.

(3) Preparation of Anode Ink;
Into 50 ml of ion-exchanged water, 0.6 g of platinum-carried carbon catalyst (TEC10E70TPM, manufactured by TANAKA KIKINZOKU KOGYO K.K.), and 5 g of a proton conductive material (aqueous solution containing 0.25 g of NAFION (5% NAFION aqueous solution, manufactured by Wako Pure Chemical Industries, Ltd.)) were put, and the resultant was mixed with an ultrasonic wave dispersion machine for 1 hour, to thereby prepare an anode ink.

(4) Production of Anode;
The GDL having the same specifications as those of the GDL used for producing the above-described cathode was formed into the size of 5 cm×5 cm, and one surface thereof was coated with the above-described anode ink using the automatic spray-coating apparatus (manufactured by San-Ei Tech Ltd.) at 80° C., to produce an electrode (anode)

provided with an anode catalyst layer, of which the total amount of the platinum-carried carbon catalyst was 1.00 mg/cm², on the GDL surface. An anode catalyst layer was formed on the coated surface.

The amount of the catalyst per unit area was calculated from a variation in mass before and after the coating and the composition of the anode ink.

(5) Production of Membrane Electrode Assembly;

A membrane electrode assembly (hereinafter also referred to as "MEA") in which an electrolyte membrane was interposed between the cathode and the anode was produced in such a manner as described below.

A NAFION membrane (NR-212, manufactured by DuPont) as the electrolyte membrane, the above-described cathode electrode, and the above-described anode electrode were prepared.

The electrolyte membrane was held by the cathode electrode and the anode electrode. In this case, the cathode catalyst layer and the anode catalyst layer were allowed to adhere to the electrolyte membrane. Then, these were thermally contact bonded using a hot pressing machine at a temperature of 140° C. and at a pressure of 1 MPa for 7 minutes, to produce MEA.

<Production of Single Cell>

The MEA was held by two sealing materials (gaskets), two separators each having a gas flow passage, two collectors and two rubber heaters, and fixed and secured with a bolt such that the pressure of contacted surface would be a prescribed value (4 N), to produce a single cell (cell area: 25 cm²) of a polymer electrolyte fuel cell.

<Start/Stop Durability Test>

The temperature of the above-described single cell, the temperature of an anode humidifier, and the temperature of a cathode humidifier were regulated to 80° C., 80° C., and 80° C., respectively. Thereafter, hydrogen as a fuel and air were supplied to the anode side and the cathode side, respectively, to evaluate the current-voltage (I-V) characteristics of the single cell. Hereinafter, a voltage value at 0.3 A/cm² in this case was referred to as "initial voltage".

In the I-V characteristics of the fuel cell, a voltage value at a certain current density becomes an index for the performance of the fuel cell. In other words, the higher initial voltage means that the initial performance of the fuel cell is higher and, in turn, that the activity of the oxygen reduction catalyst is higher.

Figure 4:
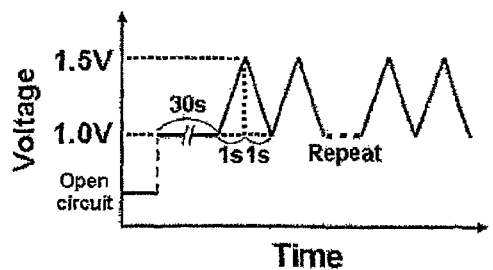
FIG. 4 illustrates a potential cycle in a start/stop durability test.

Thereafter, 4000 triangular wave potential cycles including 1.0 V to 1.5 V and 1.5 V to 1.0 V, as illustrated in FIG. 4, were applied while supplying hydrogen and nitrogen to the anode side and the cathode side, respectively, in a state in which the temperature of the above-described single cell, the temperature of the anode humidifier, and the temperature of the cathode humidifier were regulated to 80° C., 80° C., and 80° C. Then, I-V measurement was performed under the conditions mentioned above. Hereinafter, a voltage value at 0.3 A/cm² in this case is referred as "voltage after durability test".

The ratio (%) of the voltage after the durability test to an initial voltage is defined as "voltage retention rate". The higher voltage retention rate means that the start/stop durability of the fuel cell is higher and, in turn, that the start/stop durability of the oxygen reduction catalyst is higher.

All of single cells (1) to (9) in which the oxygen reduction catalysts (platinum-carried particles) of Examples were used had voltage retention rates of 80% or more and exhibited favorable start/stop durability. In particular, all of them expressed a higher voltage retention rate than that of a single cell (C10) in which the oxygen reduction catalyst (platinum-carried particles) (C10) of Comparative Example 10-2 was used. In addition, a single cell (C11) in which the oxygen reduction catalyst (platinum-carried particles) (C11) of Comparative Example 11-2 was used had a low initial voltage although having a high voltage retention rate.

Based on the above results, the oxygen reduction catalysts (platinum-carried particles) prepared in Examples (1-2) to (9-1) as described above are excellent in start/stop durability and have favorable initial performance.

In Table 7, the effects of the start/stop durabilities of the oxygen reduction catalysts comprising the platinum-carried particles are described. Since such start/stop durability is an evaluation of durability against corrosion of a carrier, it can be reasonably presumed that the oxygen reduction catalyst consisting of the composite particles used in these platinum-carried particles is also excellent in start/stop durability.

TABLE 7

Evaluation of Platinum-Carried Particles

| Examples, etc. | Single cell | Precursor | Composite particles, etc. | Catalyst subjected to start/stop durability test | Platinum concentration (% by weight) | Ink composition | Initial voltage (V) | Voltage (V) after durability test | Voltage retention rate (%) |
|---|---|---|---|---|---|---|---|---|---|
| Example 1-2 | Single cell (1) | Precursor (1) | Composite particles (1) | Platinum-carried particles (1) | 20 | A | 0.72 | 0.58 | 81 |
| Example 2-2 | Single cell (2) | Precursor (2) | Composite particles (2) | Platinum-carried particles (2) | 20 | A | 0.70 | 0.56 | 80 |
| Example 3-2 | Single cell (3) | Precursor (3) | Composite particles (3) | Platinum-carried particles (3) | 20 | A | 0.70 | 0.56 | 80 |
| Example 4-2 | Single cell (4) | Precursor (4) | Composite particles (4) | Platinum-carried particles (4) | 20 | A | 0.73 | 0.59 | 81 |
| Example 5-2 | Single cell (5) | Precursor (5) | Composite particles (5) | Platinum-carried particles (5) | 20 | A | 0.72 | 0.65 | 90 |
| Example 6-2 | Single cell (6) | Precursor (6) | Composite particles (6) | Platinum-carried particles (6) | 20 | A | 0.71 | 0.60 | 85 |

TABLE 7-continued

Evaluation of Platinum-Carried Particles

| Examples, etc. | Single cell | Precursor | Composite particles, etc. | Catalyst subjected to start/stop durability test | Platinum concentration (% by weight) | Ink composition | Initial voltage (V) | Voltage (V) after durability test | Voltage retention rate (%) |
|---|---|---|---|---|---|---|---|---|---|
| Example 7-2 | Single cell (7) | Precursor (7) | Composite particles (7) | Platinum-carried particles (7) | 20 | A | 0.63 | 0.52 | 82 |
| Example 8-2 | Single cell (8) | Precursor (8) | Composite particles (8) | Platinum-carried particles (8) | 20 | A | 0.71 | 0.58 | 81 |
| Example 9-2 | Single cell (9) | Precursor (9) | Composite particles (9) | Platinum-carried particles (9) | 20 | A | 0.67 | 0.54 | 80 |
| Comparative Example 1-2 | Single cell (C1) | Precursor (1) | Composite particles (C1) | Platinum-carried particles (C1) | 20 | A | 0.66 | 0.29 | 44 |
| Comparative Example 2-2 | Single cell (C2) | Precursor (2) | Composite particles (C2) | Platinum-carried particles (C2) | 20 | A | 0.77 | 0.28 | 37 |
| Comparative Example 10-2 | Single cell (C10) | — | — | Platinum-carried particles (C10) | 50 | C | 0.65 | 0.44 | 68 |
| Comparative Example 11-2 | Single cell (C11) | — | Particles (C11) | Platinum-carried particles (C11) | 20 | A | 0.49 | 0.44 | 90 |
| Comparative Example 12-2 | Single cell (C12) | — | Particles (C12) | Platinum-carried particles (C12) | 20 | B | 0.33 | 0.00 | 0 |
| Comparative Example 13-2 | Single cell (C13) | — | Particles (C13) | Platinum-carried particles (C13) | 8.5 | B | 0.31 | 0.00 | 0 |

The invention claimed is:

1. An oxygen reduction catalyst comprising composite particles comprising a portion comprising an inorganic metal compound and a portion containing carbon, wherein
the composite particles comprise a metal element M1, carbon, and oxygen as constituent elements;
the metal element M1 is at least one metal element selected from elements belonging to Groups 2 to 7 and elements belonging to Groups 11 to 15;
the amount of carbon atoms is 1 to 10 mol, and the amount of oxygen atoms is 1 to 3 mol, assuming that the total amount of atoms in the metal element M1 is 1 mol;
a G-band and a D-band are present in a Raman spectrum, and a V/G ratio defined in an expression described below is 0.10 to 0.35:

$$V/G \text{ ratio} = (\text{minimum value of spectral intensity in region } V \text{ which is a region between } G\text{-band and } D\text{-band})/(\text{peak intensity in } G\text{-band}).$$

2. The oxygen reduction catalyst according to claim 1, wherein the metal element M1 is at least one selected from the group consisting of vanadium, zirconium, niobium, hafnium, and tantalum.

3. The oxygen reduction catalyst according to claim 1, wherein the amount of carbon is 1 to 10 mol, the amount of nitrogen is more than 0 mol and 1 mol or less, and the amount of oxygen is 1 to 3 mol, assuming that the amount of the metal element M1 is 1 mol.

4. The oxygen reduction catalyst according to claim 1, wherein the composite particles further comprise at least one metal element M2 selected from the group consisting of iron, cobalt, and nickel; and the amount of the metal element M2 is 0.3 mol or less assuming that the total amount of the metal element M1 is 1 mol.

5. The oxygen reduction catalyst according to claim 1, wherein the portion comprising the inorganic metal compound is a crystal containing the metal element M1.

6. The oxygen reduction catalyst according to claim 5, wherein the crystallite size of the crystal is 5 to 100 nm.

7. The oxygen reduction catalyst according to claim 1, wherein a BET specific surface area is 50 to 1000 m$^2$/g.

8. The oxygen reduction catalyst according to claim 1, further comprising particles comprising a noble metal or a noble metal alloy carried on the composite particles.

9. The oxygen reduction catalyst according to claim 8, wherein the noble metal is at least one noble metal selected from platinum, palladium, iridium, rhodium, and ruthenium.

10. The oxygen reduction catalyst according to claim 8, wherein the noble metal alloy is an alloy of noble metals or an alloy comprising a noble metal and at least one metal selected from iron, nickel, chromium cobalt, titanium, copper, vanadium, and manganese.

11. The oxygen reduction catalyst according to claim 1, used as a catalyst for a reaction of converting oxygen into water.

12. An oxygen reduction catalyst comprising composite particles comprising a portion comprising an inorganic metal compound and a portion containing carbon, wherein
the composite particles comprise a metal element M1, carbon, and oxygen as constituent elements;
the metal element M1 is at least one metal element selected from elements belonging to Group 4 and elements belonging to Group 5;
the amount of carbon atoms is 1 to 10 mol, and the amount of oxygen atoms is 1 to 3 mol, assuming that the total amount of atoms in the metal element M1 is 1 mol;
a G-band and a D-band are present in a Raman spectrum, and a V/G ratio defined in an expression described below is 0.10 to 0.35:

V/G ratio=(minimum value of spectral intensity in region V which is a region between G-band and D-band)/(peak intensity in G-band).

13. The oxygen reduction catalyst according to claim 12, wherein the metal element M1 is at least one selected from the group consisting of vanadium, zirconium, niobium, hafnium, and tantalum.

14. The oxygen reduction catalyst according to claim 12, wherein the amount of carbon is 1 to 10 mol, the amount of nitrogen is more than 0 mol and 1 mol or less, and the amount of oxygen is 1 to 3 mol, assuming that the amount of the metal element M1 is 1 mol.

15. The oxygen reduction catalyst according to claim 12, wherein the composite particles further comprise at least one metal element M2 selected from the group consisting of iron, cobalt, and nickel; and the amount of the metal element M2 is 0.3 mol or less assuming that the total amount of the metal element M1 is 1 mol.

16. An ink for producing a fuel cell catalyst layer, comprising the oxygen reduction catalyst according to claim 1 dispersed in a solvent.

17. A fuel cell catalyst layer comprising the oxygen reduction catalyst according claim 1.

18. A fuel cell electrode comprising the fuel cell catalyst layer according to claim 17.

19. A membrane electrode assembly comprising a cathode catalyst layer, an anode catalyst layer, and a polymer electrolyte membrane interposed between both of the catalyst layers, wherein the cathode catalyst layer and/or the anode catalyst layer are the fuel cell catalyst layers according to claim 17.

20. A fuel cell comprising the membrane electrode assembly according to claim 19.

* * * * *